US007753784B2

(12) United States Patent
Baerlocher

(10) Patent No.: US 7,753,784 B2
(45) Date of Patent: Jul. 13, 2010

(54) GAMING DEVICE HAVING PROGRESSIVE AWARDS AND SUPPLEMENTAL AWARDS

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 12/546,304

(22) Filed: Aug. 24, 2009

(65) Prior Publication Data

US 2010/0016062 A1 Jan. 21, 2010

Related U.S. Application Data

(63) Continuation of application No. 11/220,108, filed on Sep. 6, 2005, now Pat. No. 7,597,621.

(51) Int. Cl.
*A63F 9/24* (2006.01)
*A63F 13/00* (2006.01)

(52) U.S. Cl. ............................ 463/28; 463/26; 463/27; 463/42; 463/43; 463/25

(58) Field of Classification Search ............ 463/16–22, 463/25–28, 40–42
See application file for complete search history.

(56) References Cited

U.S. PATENT DOCUMENTS

| | | | | |
|---|---|---|---|---|
| 422,064 | A * | 2/1890 | Bayles | 138/170 |
| 3,633,915 | A * | 1/1972 | Lippert | 273/274 |
| 3,998,309 | A | 12/1976 | Mandas et al. | |
| 4,072,930 | A | 2/1978 | Lucero et al. | |
| 4,238,127 | A | 12/1980 | Lucero et al. | |
| 4,277,064 | A | 7/1981 | Newman | |
| 4,283,709 | A | 8/1981 | Lucero et al. | |
| 4,335,809 | A | 6/1982 | Wain | |
| 4,409,656 | A | 10/1983 | Andersen et al. | |
| 4,448,419 | A | 5/1984 | Telnaes | |
| 4,494,197 | A | 1/1985 | Troy et al. | |
| 4,537,681 | A * | 8/1985 | Argiropoulos et al. | 210/317 |
| 4,573,681 | A | 3/1986 | Okada | |
| 4,582,324 | A | 4/1986 | Koza et al. | |

(Continued)

FOREIGN PATENT DOCUMENTS

| | | |
|---|---|---|
| AU | 524709 | 9/1982 |

(Continued)

OTHER PUBLICATIONS

Aristrocrat Brochure, written by Aristocrat Gaming, published in 2004.

(Continued)

*Primary Examiner*—John M Hotaling, II
*Assistant Examiner*—Steven J. Hylinski
(74) *Attorney, Agent, or Firm*—K&L Gates LLP

(57) ABSTRACT

A gaming system including a central server linked to a plurality of gaming machines. The central server monitors wagers on the gaming machines. Based at least in part on the wagers the central server determines when bonus events will occur and which gaming machine(s) will provide the bonus awards. In one embodiment, the central server determines which gaming machine(s) will provide progressive awards and/or supplemental bonus awards, wherein the number of provided supplemental awards is determined based on the number of active gaming machines. Each supplemental bonus award provided by each gaming device is based on any accumulated wagers placed at that gaming device.

52 Claims, 7 Drawing Sheets

U.S. PATENT DOCUMENTS 4,624,459 A 11/1986 Kaufman
4,636,951 A 1/1987 Harlick
4,652,998 A 3/1987 Koza et al.
4,695,053 A * 9/1987 Vazquez et al. ............... 463/18
4,721,307 A 1/1988 Okada
4,743,024 A 5/1988 Helm et al.
4,760,527 A 7/1988 Sidley
4,775,155 A 10/1988 Lees
4,805,907 A 2/1989 Hagiwara
4,837,728 A 6/1989 Barrie et al.
4,842,278 A 6/1989 Markowicz
4,856,787 A 8/1989 Itkis
4,871,171 A 10/1989 Rivero
4,880,237 A 11/1989 Kishishita
4,926,327 A 5/1990 Sidley
4,964,638 A 10/1990 Ishida
4,991,848 A 2/1991 Greenwood et al.
5,038,022 A 8/1991 Lucero
5,048,833 A 9/1991 Lamle
5,074,559 A 12/1991 Okada
5,116,055 A 5/1992 Tracy
5,123,649 A 6/1992 Tiberio
5,127,651 A 7/1992 Okada
5,158,293 A 10/1992 Mullins
5,159,097 A * 10/1992 Rosentreter et al. ......... 558/167
5,178,390 A * 1/1993 Okada .................... 273/143 R
5,186,894 A * 2/1993 Katsuyama .................. 422/56
5,205,555 A * 4/1993 Hamano ................. 273/143 R
5,209,479 A 5/1993 Nagao
5,217,224 A 6/1993 Sincock
5,249,800 A 10/1993 Hilgendorf et al.
5,259,616 A 11/1993 Bergmann
5,265,874 A 11/1993 Dickinson et al.
5,275,400 A 1/1994 Weingardt
5,276,312 A 1/1994 McCarthy
5,277,424 A 1/1994 Wilms
5,280,909 A 1/1994 Tracy
5,286,023 A 2/1994 Wood
5,292,127 A 3/1994 Kelly et al.
5,321,241 A 6/1994 Craine
5,324,035 A 6/1994 Morris et al.
5,326,104 A 7/1994 Pease et al.
5,342,047 A 8/1994 Heidel et al.
5,342,049 A 8/1994 Wichinsky et al.
5,344,144 A 9/1994 Canon
5,351,970 A 10/1994 Fioretti
5,377,993 A 1/1995 Josephs
5,382,023 A * 1/1995 Roberts et al. .......... 273/142 H
5,393,057 A 2/1995 Marnell, II
5,398,932 A 3/1995 Eberhardt et al.
5,401,024 A 3/1995 Simunek
5,417,430 A 5/1995 Breeding
5,423,539 A 6/1995 Nagao
5,429,361 A 7/1995 Raven et al.
5,456,465 A 10/1995 Durham
5,470,079 A 11/1995 LeStrange et al.
5,472,194 A 12/1995 Breeding et al.
5,489,101 A 2/1996 Moody
5,511,781 A 4/1996 Wood
5,524,888 A 6/1996 Heidel
5,536,016 A 7/1996 Thompson
5,542,669 A * 8/1996 Charron et al. ............... 463/13
5,547,192 A 8/1996 Ishibashi
5,560,603 A 10/1996 Seeling et al.
5,564,700 A 10/1996 Celona
5,566,337 A 10/1996 Szymanski
5,570,885 A 11/1996 Ornstein
5,580,053 A 12/1996 Crouch
5,580,309 A 12/1996 Piechowiak et al.
5,584,763 A * 12/1996 Kelly et al. ................... 463/16
5,601,487 A 2/1997 Oshima
5,611,535 A 3/1997 Tiberio
5,611,730 A 3/1997 Weiss
5,626,341 A 5/1997 Jones
5,645,486 A 7/1997 Nagao et al.
5,647,798 A * 7/1997 Falciglia ...................... 463/19
5,655,961 A 8/1997 Acres et al.
5,674,128 A 10/1997 Holch et al.
5,702,304 A 12/1997 Acres et al.
5,707,285 A 1/1998 Place et al.
5,707,286 A 1/1998 Carlson
5,711,525 A * 1/1998 Breeding .................... 273/292
5,722,891 A 3/1998 Inoue
5,732,948 A 3/1998 Yoseloff
5,741,183 A 4/1998 Acres et al.
5,743,800 A 4/1998 Huard et al.
5,752,882 A 5/1998 Acres et al.
5,761,647 A 6/1998 Boushy
5,762,552 A 6/1998 Vuong
5,766,076 A 6/1998 Pease et al.
5,769,716 A 6/1998 Saffari et al.
5,772,509 A * 6/1998 Weiss .......................... 463/16
5,772,511 A 6/1998 Smeltzer
RE35,864 E 7/1998 Weingardt
5,775,692 A * 7/1998 Watts et al. ............. 273/143 R
5,779,545 A 7/1998 Berg et al.
5,779,549 A 7/1998 Walker et al.
5,788,573 A 8/1998 Baerlocher et al.
5,800,269 A 9/1998 Holch et al.
5,806,855 A 9/1998 Cherry
5,807,172 A 9/1998 Piechowiak
5,816,918 A 10/1998 Kelly et al.
5,820,459 A 10/1998 Acres et al.
5,823,874 A 10/1998 Adams
5,833,537 A 11/1998 Barrie
5,833,538 A 11/1998 Weiss
5,833,540 A 11/1998 Miodunski et al.
5,836,817 A 11/1998 Acres et al.
5,848,932 A 12/1998 Adams
5,851,011 A 12/1998 Lott
5,851,147 A * 12/1998 Stupak et al. ................. 463/13
5,851,148 A 12/1998 Brune et al.
5,851,149 A 12/1998 Xidos et al.
5,855,158 A * 1/1999 Donofrio ..................... 83/835
5,855,514 A 1/1999 Kamille
5,855,515 A 1/1999 Pease et al.
5,873,781 A * 2/1999 Keane ......................... 463/22
5,876,284 A 3/1999 Acres et al.
5,882,261 A * 3/1999 Adams ........................ 463/20
5,885,158 A 3/1999 Torango et al.
5,902,184 A 5/1999 Bennett
5,910,048 A 6/1999 Feinburg
5,911,418 A * 6/1999 Adams ....................... 273/274
5,919,088 A 7/1999 Weiss
5,941,418 A * 8/1999 Box et al. ..................... 222/71
5,941,773 A 8/1999 Harlick
5,944,606 A 8/1999 Gerow
5,947,820 A 9/1999 Morro et al.
5,947,822 A 9/1999 Weiss
5,951,011 A 9/1999 Potter et al.
5,951,397 A * 9/1999 Dickinson .................... 463/36
5,964,463 A * 10/1999 Moore, Jr. ................... 273/274
5,967,894 A * 10/1999 Kinoshita et al. ............. 463/13
5,980,384 A 11/1999 Barrie
5,984,779 A * 11/1999 Bridgeman et al. ........... 463/16
5,984,781 A * 11/1999 Sunaga ........................ 463/20
5,989,121 A 11/1999 Sakamoto
5,993,316 A 11/1999 Coyle et al.
5,997,400 A 12/1999 Seelig et al.
5,997,401 A * 12/1999 Crawford ..................... 463/20
6,001,016 A 12/1999 Walker et al.
6,004,207 A 12/1999 Wilson, Jr. et al.
6,007,427 A 12/1999 Wiener
6,012,982 A 1/2000 Piechowiak et al.

6,015,346 A * 1/2000 Bennett ........................ 463/20
6,019,369 A * 2/2000 Nakagawa et al. .......... 273/246
6,033,307 A * 3/2000 Vancura ....................... 463/20
6,039,648 A 3/2000 Guinn et al.
6,039,649 A 3/2000 Schulze
6,044,162 A * 3/2000 Mead et al. ................. 381/312
6,048,269 A 4/2000 Burns et al.
6,050,895 A 4/2000 Luciano et al.
6,056,642 A 5/2000 Bennett
6,059,289 A 5/2000 Vancura
6,059,658 A * 5/2000 Mangano et al. .............. 463/16
6,068,552 A * 5/2000 Walker et al. ................. 463/21
6,068,553 A 5/2000 Parker
6,071,190 A 6/2000 Weiss et al.
6,077,162 A 6/2000 Weiss
6,077,172 A 6/2000 Butler
6,089,976 A * 7/2000 Schneider et al. ............. 463/16
6,089,977 A 7/2000 Bennett
6,089,978 A 7/2000 Adams
6,089,980 A 7/2000 Gauselmann
6,092,980 A * 7/2000 Kumasaka et al. .......... 414/804
6,093,102 A * 7/2000 Bennett ....................... 463/20
6,099,408 A 8/2000 Schneier et al.
6,102,798 A * 8/2000 Bennett ....................... 463/16
6,110,041 A 8/2000 Walker et al.
6,110,043 A 8/2000 Olsen
6,117,013 A 9/2000 Eiba
6,120,031 A * 9/2000 Adams ....................... 273/292
6,126,541 A * 10/2000 Fuchs .......................... 463/13
6,126,542 A * 10/2000 Fier ............................ 463/16
6,135,884 A 10/2000 Hedrick et al.
6,142,872 A 11/2000 Walker et al.
6,142,873 A * 11/2000 Weiss et al. ................... 463/20
6,142,874 A * 11/2000 Kodachi et al. ............... 463/20
6,142,875 A * 11/2000 Kodachi et al. ............... 463/20
6,146,270 A * 11/2000 Huard et al. .................. 463/12
6,146,273 A 11/2000 Olsen
6,149,156 A * 11/2000 Feola ......................... 273/292
6,149,521 A 11/2000 Sanduski
6,152,823 A 11/2000 Lacoste et al.
6,155,925 A 12/2000 Giobbi et al.
6,159,095 A * 12/2000 Frohm et al. .................. 463/19
6,159,096 A * 12/2000 Yoseloff ...................... 463/20
6,159,097 A 12/2000 Gura
6,159,098 A 12/2000 Slomiany et al.
6,162,121 A 12/2000 Morro et al.
6,162,122 A 12/2000 Acres et al.
6,168,520 B1 1/2001 Baerlocher et al.
6,168,523 B1 * 1/2001 Piechowiak et al. ........... 463/26
6,173,955 B1 * 1/2001 Perrie et al. ................. 273/146
6,174,233 B1 * 1/2001 Sunaga et al. ................. 463/20
6,174,235 B1 * 1/2001 Walker et al. ................. 463/25
6,183,366 B1 2/2001 Goldberg et al.
6,186,894 B1 2/2001 Mayeroff
6,190,255 B1 * 2/2001 Thomas et al. ................ 463/20
6,203,010 B1 3/2001 Jorasch et al.
6,203,429 B1 * 3/2001 Demar et al. ................. 463/20
6,203,430 B1 3/2001 Walker et al.
6,206,374 B1 3/2001 Jones
6,206,782 B1 3/2001 Walker et al.
6,210,275 B1 4/2001 Olsen
6,210,277 B1 4/2001 Stefan
6,210,279 B1 * 4/2001 Dickinson .................... 463/37
6,213,876 B1 * 4/2001 Moore, Jr. .................... 463/22
6,217,448 B1 4/2001 Olsen
6,224,482 B1 5/2001 Bennett
6,224,483 B1 5/2001 Mayeroff
6,224,484 B1 5/2001 Okuda et al.
6,231,442 B1 5/2001 Mayeroff
6,231,445 B1 5/2001 Acres
6,238,288 B1 5/2001 Walker et al.
6,241,608 B1 6/2001 Torango
6,244,958 B1 6/2001 Acres
6,254,483 B1 7/2001 Acres
6,257,981 B1 7/2001 Acres et al.
6,261,177 B1 * 7/2001 Bennett ....................... 463/16
6,264,557 B1 7/2001 Schneier et al.
6,270,409 B1 8/2001 Shuster
6,293,866 B1 9/2001 Walker et al.
RE37,414 E 10/2001 Harlick
6,302,790 B1 * 10/2001 Brossard ...................... 463/20
6,302,793 B1 10/2001 Fertitta, III et al.
6,305,686 B1 * 10/2001 Perrie et al. ................. 273/146
6,309,298 B1 10/2001 Gerow
6,309,300 B1 10/2001 Glavich
6,311,976 B1 11/2001 Yoseloff et al.
6,312,330 B1 11/2001 Jones et al.
6,312,332 B1 11/2001 Walker et al.
6,312,333 B1 11/2001 Acres
6,312,334 B1 * 11/2001 Yoseloff ...................... 463/25
6,315,662 B1 11/2001 Jorasch et al.
6,319,122 B1 11/2001 Packes, Jr. et al.
6,319,125 B1 11/2001 Acres
6,328,649 B1 12/2001 Randall et al.
6,331,143 B1 * 12/2001 Yoseloff ...................... 463/18
6,334,814 B1 1/2002 Adams
6,336,857 B1 1/2002 McBride
6,340,158 B2 1/2002 Preice et al.
6,345,043 B1 * 2/2002 Hsu ........................... 370/324
6,346,043 B1 2/2002 Colin et al.
6,347,996 B1 2/2002 Gilmore et al.
6,358,147 B1 3/2002 Jaffe et al.
6,358,149 B1 3/2002 Schneider et al.
6,361,441 B1 3/2002 Walker et al.
6,364,766 B1 * 4/2002 Anderson et al. ............. 463/16
6,364,768 B1 4/2002 Acres et al.
6,364,769 B1 4/2002 Weiss et al.
6,371,852 B1 4/2002 Acres
6,375,187 B1 * 4/2002 Baerlocher .............. 273/143 R
6,375,567 B1 4/2002 Acres
6,375,568 B1 4/2002 Roffman et al.
6,375,569 B1 4/2002 Acres
6,398,218 B1 6/2002 Vancura
6,406,369 B1 6/2002 Baerlocher et al.
6,416,408 B2 7/2002 Tracy et al.
6,416,409 B1 7/2002 Jordan
6,419,579 B1 7/2002 Bennett
6,419,583 B1 7/2002 Crumby et al.
6,428,412 B1 8/2002 Anderson et al.
6,431,983 B2 8/2002 Acres
6,435,511 B1 8/2002 Vancura et al.
6,435,968 B1 8/2002 Torango
6,439,995 B1 * 8/2002 Hughs-Baird et al. ......... 463/20
6,454,651 B1 9/2002 Yoseloff
RE37,885 E 10/2002 Acres et al.
6,461,241 B1 10/2002 Webb et al.
6,471,208 B2 10/2002 Yoseloff et al.
6,471,591 B1 10/2002 Crumby
6,481,712 B1 * 11/2002 Yap ............................ 271/303
6,481,713 B2 11/2002 Perrie et al.
6,503,146 B2 * 1/2003 Walker et al. ................. 463/25
6,506,118 B1 * 1/2003 Baerlocher et al. ............ 463/25
6,533,664 B1 3/2003 Crumby
6,537,150 B1 3/2003 Luciano et al.
6,554,283 B2 4/2003 Vancura et al.
6,554,710 B1 4/2003 Olson
6,561,904 B2 5/2003 Locke et al.
6,565,434 B1 5/2003 Acres
6,569,015 B1 5/2003 Baerlocher et al.
6,572,471 B1 6/2003 Bennett
6,575,832 B1 6/2003 Manfredi et al.
6,585,592 B1 * 7/2003 Crumby ....................... 463/26
6,589,115 B2 7/2003 Walker et al.
6,592,460 B2 7/2003 Torango
6,595,853 B1 7/2003 Osawa
6,599,190 B2 7/2003 Osawa 6,599,193 B2 7/2003 Baerlocher et al.
6,602,137 B2 * 8/2003 Kaminkow et al. ........... 463/16
6,607,438 B2 * 8/2003 Baerlocher et al. ............ 463/16
6,607,441 B1 8/2003 Acres
6,609,973 B1 8/2003 Weiss
6,620,046 B2 9/2003 Rowe
6,626,758 B1 9/2003 Parham et al.
6,632,141 B2 * 10/2003 Webb et al. ................... 463/25
6,634,944 B2 10/2003 Osawa
6,634,946 B1 10/2003 Bridgeman et al.
6,645,077 B2 11/2003 Rowe
6,648,753 B1 * 11/2003 Tracy et al. ................... 463/16
6,648,754 B2 * 11/2003 Baerlocher et al. ............ 463/17
6,648,759 B2 11/2003 Vancura
6,652,378 B2 * 11/2003 Cannon et al. ................ 463/20
6,656,047 B1 12/2003 Tarantino et al.
6,656,048 B2 12/2003 Olsen
6,656,052 B2 12/2003 Abramopoulos et al.
6,675,152 B1 1/2004 Prasad et al.
6,692,354 B2 * 2/2004 Tracy et al. ................... 463/16
6,692,355 B2 2/2004 Baerlocher et al.
6,712,695 B2 3/2004 Mothwurf et al.
6,712,697 B2 3/2004 Acres
6,712,699 B2 * 3/2004 Walker et al. ................. 463/30
6,719,630 B1 4/2004 Seelig et al.
6,733,386 B2 * 5/2004 Cuddy et al. .................. 463/17
6,733,390 B2 5/2004 Walker et al.
6,749,510 B2 6/2004 Giobbi
6,776,714 B2 8/2004 Ungaro et al.
6,776,715 B2 8/2004 Price
6,800,030 B2 10/2004 Acres
6,805,352 B2 10/2004 Hunter
6,832,958 B2 12/2004 Acres et al.
6,837,788 B2 1/2005 Cannon
6,887,154 B1 5/2005 Luciano, Jr. et al.
6,899,625 B2 5/2005 Luciano, Jr. et al.
6,910,964 B2 6/2005 Acres
6,918,834 B2 7/2005 Vancura
6,939,234 B2 9/2005 Beatty
RE38,812 E 10/2005 Acres et al.
6,966,834 B1 11/2005 Johnson
6,991,544 B2 * 1/2006 Soltys et al. .................. 463/42
7,004,466 B2 * 2/2006 Gauselmann ............... 273/139
7,008,319 B2 * 3/2006 Montgomery et al. ......... 463/21
7,008,324 B1 3/2006 Johnson et al.
7,056,215 B1 6/2006 Olive
7,066,813 B1 * 6/2006 Sakamoto et al. ............. 463/20
7,077,746 B2 * 7/2006 Torango ...................... 463/25
7,147,557 B1 * 12/2006 Tracy et al. ................... 463/16
7,167,142 B2 * 1/2007 Buckley et al. .............. 345/2.1
7,169,041 B2 * 1/2007 Tessmer et al. ............... 463/16
7,172,505 B2 * 2/2007 Vancura ....................... 463/16
7,172,508 B2 2/2007 Simon et al.
7,297,059 B2 * 11/2007 Vancura et al. ............... 463/27
7,311,598 B2 12/2007 Kaminkow et al.
7,311,604 B2 12/2007 Kaminkow et al.
7,361,085 B2 * 4/2008 Packes et al. ................. 463/16
7,485,043 B2 * 2/2009 Beaulieu et al. ............... 463/42
7,500,915 B2 * 3/2009 Wolf et al. .................... 463/27
7,530,896 B2 * 5/2009 Gauselmann ................ 463/27
2001/0004607 A1 6/2001 Olsen
2001/0018361 A1 8/2001 Acres
2001/0031661 A1 10/2001 Wiltshire et al.
2001/0036857 A1 11/2001 Mothwurf et al.
2001/0049303 A1 12/2001 Found
2001/0055990 A1 12/2001 Acres
2002/0016202 A1 * 2/2002 Fertitta et al. ................. 463/25
2002/0028706 A1 3/2002 Barnard et al.
2002/0039923 A1 4/2002 Cannon et al.
2002/0058546 A2 5/2002 Acres
2002/0138594 A1 9/2002 Rowe
2002/0152120 A1 10/2002 Howington
2002/0165023 A1 11/2002 Brosnan et al.
2002/0177483 A1 11/2002 Cannon et al.
2003/0003981 A1 1/2003 Valenti
2003/0013521 A1 1/2003 Cole et al.
2003/0027625 A1 2/2003 Rowe
2003/0027630 A1 2/2003 Kelly et al.
2003/0027638 A1 2/2003 Schneider et al.
2003/0045350 A1 3/2003 Baerlocher et al.
2003/0060266 A1 3/2003 Baerlocher
2003/0060279 A1 3/2003 Torango
2003/0092484 A1 5/2003 Schneider et al.
2003/0100361 A1 5/2003 Sharpless et al.
2003/0109307 A1 * 6/2003 Boyd .......................... 463/41
2003/0119581 A1 6/2003 Cannon et al.
2003/0144965 A1 7/2003 Prasad et al.
2003/0148804 A1 8/2003 Ikeya et al.
2003/0148807 A1 8/2003 Acres
2003/0171145 A1 9/2003 Rowe
2003/0222402 A1 12/2003 Olive
2003/0224852 A1 12/2003 Walker et al.
2003/0228904 A1 12/2003 Acres et al.
2004/0009811 A1 1/2004 Torango
2004/0048669 A1 3/2004 Rowe
2004/0072613 A1 4/2004 Visocnik
2004/0072615 A1 4/2004 Maya et al.
2004/0087368 A1 5/2004 Gauselmann
2004/0102243 A1 5/2004 Olsen
2004/0142742 A1 * 7/2004 Schneider et al. ............. 463/25
2004/0204226 A1 * 10/2004 Foster et al. .................. 463/20
2004/0214628 A1 10/2004 Boyd et al.
2004/0229683 A1 11/2004 Mothwurf et al.
2004/0242297 A1 12/2004 Walker
2005/0026669 A1 * 2/2005 Nelson et al. ................. 463/16
2005/0032573 A1 2/2005 Acres et al.
2005/0054430 A1 3/2005 Pitman et al.
2005/0070356 A1 3/2005 Mothwurf
2005/0079911 A1 4/2005 Nakatsu
2005/0119044 A1 6/2005 Lim et al.
2005/0119047 A1 6/2005 Olive
2005/0143168 A1 6/2005 Torango
2005/0159211 A1 7/2005 Englman
2005/0176488 A1 8/2005 Olive
2005/0192083 A1 9/2005 Iwamoto
2005/0209004 A1 9/2005 Torango
2005/0239542 A1 10/2005 Olsen
2005/0267610 A1 12/2005 Shinoda
2006/0003829 A1 1/2006 Thomas
2006/0009285 A1 1/2006 Pryzby et al.
2006/0009291 A1 * 1/2006 Martin et al. ................. 463/46
2006/0025210 A1 2/2006 Johnson
2006/0030403 A1 * 2/2006 Lafky et al. ................... 463/27
2006/0035705 A1 * 2/2006 Jordan et al. .................. 463/25
2006/0040723 A1 2/2006 Baerlocher et al.
2006/0040732 A1 2/2006 Baerlocher et al.
2006/0040733 A1 2/2006 Baerlocher et al.
2006/0040734 A1 2/2006 Baerlocher et al.
2006/0040736 A1 2/2006 Baerlocher et al.
2006/0046821 A1 * 3/2006 Kaminkow et al. ........... 463/16
2006/0046822 A1 3/2006 Kaminkow et al.
2006/0046823 A1 3/2006 Kaminkow et al.
2006/0052158 A1 3/2006 Raniere
2006/0073870 A1 * 4/2006 Cannon ....................... 463/17
2006/0084502 A1 * 4/2006 Downs et al. ................. 463/29
2006/0116201 A1 6/2006 Gauselmann
2007/0015585 A1 1/2007 Sartini et al.
2007/0054728 A1 * 3/2007 Hood .......................... 463/16
2007/0060316 A1 3/2007 O'Halloran
2007/0105619 A1 5/2007 Kniesteadt et al.
2007/0149292 A1 6/2007 Kaminkow et al.
2007/0155485 A1 * 7/2007 Cuddy et al. .................. 463/25
2007/0202943 A1 8/2007 Thomas
2007/0207850 A1 9/2007 Darrah et al.
2008/0020817 A1 1/2008 Kaminkow et al.
2008/0020842 A1 1/2008 Kaminkow et al.

2008/0214263 A1* 9/2008 Walker et al. ................. 463/16

FOREIGN PATENT DOCUMENTS

| | | |
|---|---|---|
| AU | 555905 | 10/1986 |
| AU | 567001 | 11/1987 |
| AU | 585160 | 6/1989 |
| AU | 589158 | 10/1989 |
| AU | 593059 | 2/1990 |
| AU | 630112 | 3/1990 |
| AU | 628330 | 9/1992 |
| AU | 633469 | 1/1993 |
| AU | 649009 | 5/1994 |
| AU | 655801 | 1/1995 |
| AU | 1996 70247 | 4/1997 |
| AU | 680920 | 8/1997 |
| AU | 1996 50327 | 10/1997 |
| AU | 1998 63553 | 10/1998 |
| AU | 199884162 | 3/1999 |
| AU | 707687 | 7/1999 |
| AU | 709724 | 9/1999 |
| AU | 199917318 | 9/1999 |
| AU | 711501 | 10/1999 |
| AU | 716299 | 2/2000 |
| AU | 721968 | 7/2000 |
| AU | 722107 | 7/2000 |
| AU | 728788 | 1/2001 |
| AU | 2001 1000032 | 11/2001 |
| AU | 2001 1000033 | 11/2001 |
| AU | 748263 | 5/2002 |
| AU | 749222 | 6/2002 |
| AU | 754689 | 11/2002 |
| AU | 758306 | 3/2003 |
| AU | 1999 43453 | 4/2003 |
| DE | 3415114 | 11/1985 |
| DE | 3917683 | 12/1990 |
| DE | 4200254 | 8/1993 |
| EP | 0 342 797 | 11/1989 |
| EP | 0 798 676 | 10/1997 |
| EP | 0 874 337 | 10/1998 |
| EP | 0 926 645 | 6/1999 |
| EP | 0 944 030 | 9/1999 |
| EP | 1 467 329 | 10/2004 |
| EP | 1 498 860 | 1/2005 |
| EP | 1 513 114 | 3/2005 |
| EP | 1 528 516 | 5/2005 |
| EP | 1 528 517 | 5/2005 |
| GB | 2118445 | 11/1983 |
| GB | 2 137 392 | 10/1984 |
| GB | 2 139 390 | 11/1984 |
| GB | 2 147 773 | 5/1985 |
| GB | 2 148 135 | 5/1985 |
| GB | 1 151 054 | 7/1985 |
| GB | 2 153 572 | 8/1985 |
| GB | 2231189 | 11/1990 |
| GB | 2 282 690 | 4/1995 |
| GB | 2 328 311 | 2/1999 |
| GB | 2 387 703 | 10/2003 |
| JP | 7148307 | 6/1995 |
| WO | WO 94 12256 | 6/1994 |
| WO | WO 95 22811 | 8/1995 |
| WO | WO 95 30944 | 11/1995 |
| WO | WO 97 12338 | 4/1997 |
| WO | WO 97 27568 | 7/1997 |
| WO | WO 98 35309 | 8/1998 |
| WO | WO 98 47115 | 10/1998 |
| WO | WO 98 51384 | 11/1998 |
| WO | WO 99 03078 | 1/1999 |
| WO | WO 99 10849 | 3/1999 |
| WO | WO 00 12186 | 3/2000 |
| WO | WO 00 32286 | 6/2000 |
| WO | WO 01 10523 | 2/2001 |
| WO | WO 01 15055 | 3/2001 |
| WO | WO 01 15790 | 3/2001 |
| WO | PCT/US02/30858 | 4/2003 |
| WO | WO 03 075235 | 9/2003 |
| WO | WO 2004 066061 | 8/2004 |
| WO | WO 2005 076193 | 8/2005 |
| WO | WO 2005 081623 | 9/2005 |
| WO | WO 2005 083599 | 9/2005 |
| WO | WO 2005 099425 | 10/2005 |
| WO | WO 2005 099845 | 10/2005 |
| WO | WO 2005 106702 | 11/2005 |
| WO | WO 2005 113093 | 12/2005 |

OTHER PUBLICATIONS

Bally Slot Machines Electro-Mechanicals 1964-1980 Book [In Part], Revised 3rd Edition written by Marshall Fey.

Bingo Advertisement and Jackpot Bingo Advertisements, written by Casino Data Systems, published in 1998 and 2001.

Cartoon Jackpots description, printed from www.ballygaming.com/home.asp, on Feb. 4, 2005.

Cash Express Advertisements, written by Aristocrat, published in 2002.

Catalogue of Champions Advertisement, written by Aristocrat, published in 1990.

Computa Game Equipment Manual written and compiled by Russell Campbell, Sep. 1990.

Computa Game, "The Software Manual", Revision 3 for Computa Game Software Version 2.41 written by Clive Davis et al., published by Computa Game Pty Ltd., Jul. 1991.

Court Ruling on Claim Construction in *Cynthia Jean Goff* v. *Harrah's Operating Company, Inc., et al.*, dated Dec. 30, 2005.

Defendant ATA's Supplemental Response to Plaintiffs Interrogatory.

Double Spin Five Times Pay Advertisement, written by IGT, published prior to 2000.

Fast Buck Systems Manual, written by International Game Technology, available to Mirage shift supervisors at least as early as May 30, 1990.

Integrated Real Time On-Line Slot System—SDI, written by GRIPS Electronic GmbH, printed from website reported as archived on Feb. 20, 1997 (available at http://web.archive.org/web/19970220165559/www.grips.com/sdi.htm).

Jackpot Carnival Hyperlink Advertisement, written by Aristocrat, published prior to 2002.

Lemons, Cherries and Bell-Fruit-Gum, pp. 1 to 4 and 304 to 314, written by Bueschel, published in Royal Bell Books in Nov. 1995.

Mikohn Product Catalog, Chapters 1, 2, 6, 7 and 8, written by Mikohn, published in Jan. 1993.

Mikohn Supper Controller Manual, Chapters 1 to 3 and 6 to 7, written by Mikohn, published in 1989.

Millioni$er articles, written by Strictly Slots, published in Sep. 2003 and Mar. 2004.

Money Time advertisement, written by Mikohn Gaming, published in 1999.

M-Slot Series Primary Reel Product description from Lemons, Cherries and Bell-Fruit-Gum, written by Richard M. Bueschel, published in 1995.

PEM—Precision Electronic Meter, written by GRIPS Electronic GmbH, printed from website reported as archived on Feb. 20, 1997 (available at http://web.archive.org/web/19970220165753/www.grips.com/pem.htm).

Penguin Pucks article, written by Note in Gaming Marketplace, published prior to 2004.

Plaintiff Torango's Supplemental Response to Defendant Aristocrat Technologies, Inc's First Set of Interrogatories.

Player Tracking on Slots, written by GRIPS Electronic GmbH, printed from website reported as archived on Feb. 20, 1997 (available at http://web.archive.org/web/19970220165921/www.grips.com/playtrac.htm).

Progressive Jackpot System article, printed from casinomagazine.com.managearticle.asp@c_290&a=518, on Jun. 21, 2004.

ProLINK Progressive Controller User/Reference Manual, written by Casino Data Systems, published in Apr. 1997.

Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines A Pictorial History of the First 100 Years (pp. 216, 242 to 243), 5th edition, written by Marshall Fey, published in 1983-1997.
Statement of Grounds and Particulars in Support of Opposition, from Australian Patent Application 754689 in the name of Aristocrat Technologies Australia Pty Ltd. and Opposition thereto by Acres Gaming, Inc., dated May 21, 2003.
Statutory Declaration of John Boris Golja from Australian Patent Application 754689 in the name of Aristocrat Technologies Australia Pty Ltd. and Opposition thereto by Acres Gaming, Inc., dated May 21, 2004.
Statutory Declaration of Phillip Charles Dimond, from Australian Patent Application 754689 in the name of Aristocrat Technologies Australia Pty Ltd. and Opposition thereto by Acres Gaming, Inc., dated Mar. 2, 2005.
Statutory Declaration of Scott Olive, from in the matter of Aristocrat Technologies Australia Pty Ltd. Opposition to Patent Application 765084 Acres Gaming Inc., dated May 9, 2005.
Surprize Gaming Machine Advertisement, written by Aristocrat Leisure Industries, Australia, published prior to 2004.
Surprize Software Specification for MV2030—var 01, written by Aristocrat Leisure Industries, Australia, published prior to 2004.
U.S. Appl. No. 60/035,513 by Torango and Lannoy, filed Jan. 15, 1997 and referenced by U.S. Patent Nos. 6,435,968, 6,241,608 and 6,592,460.
U.S. Appl. No. 60/040,982 by Torango and Lannoy, filed Mar. 17, 1997 and referenced by U.S. Patent Nos. 6,435,968, 6,241,608 and 6,592,460.
U.S. Appl. No. 60/050,971 by Torango and Lannoy, filed Jun. 19, 1997 and referenced by U.S. Patent Nos. 6,435,968, 6,241,608 and 6,592,460.
Wide Area Progressive Link System, written by GRIPS Electronic GmbH, printed from website reported as archived on Feb. 20, 1997 (available at http://web.archive.org/web/19970220165457/www.grips.com/wap.htm).
Zorro Advertisement, written by Aristocrat, published in 2004.

* cited by examiner

| Progressive | Progressive Award #1 (100a) | Progressive Award #2 (100b) | Progressive Award #3 (100c) |
|---|---|---|---|
| Range of Hit Values | $10 - $100 | $50 - $250 | $100 to $1,000 |
| Progressive Award Hit Value | $83 | $121 | $885 |
| Supplemental Award Bonus Event Threshold Amounts | $37<br>$59 | N/A | $114<br>$391<br>$417 |

GAMING DEVICE HAVING PROGRESSIVE AWARDS AND SUPPLEMENTAL AWARDS

PRIORITY CLAIM

This application is a continuation of, claims priority to and the benefit of U.S. patent application Ser. No. 11/220,108, filed on Sep. 6, 2005, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may allow the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Certain secondary or bonus games are activated automatically and certain secondary or bonus games require player activation. Once activated, certain secondary or bonus games play to the end or final bonus award automatically and certain secondary or bonus games require at least some level of player interaction. The amount of player interaction may vary. In certain secondary or bonus games, the player may need to pick selections and in certain secondary or bonus games, the player may need to make one or more decisions, such as whether to risk one amount for a higher amount. From the triggering of these secondary or bonus games to the end of these secondary or bonus games, the player is generally provided indications, instructions and/or information about the play of these secondary or bonus games. These indications, instructions and/or provided information inform the player of how and why the player is obtaining or has obtained any award(s) in the secondary or bonus game. Gaming machines often include a display device, such as one or more reels, wheels, dice, video display screens, to display how and why the player is obtaining the secondary or bonus award.

Progressive awards associated with gaming machines are also known. A progressive award is an award amount which includes an initial amount funded by a casino and an additional amount funded through a portion of each wager made on the progressive gaming machine. For example, 0.1% of each wager placed on the primary game of the gaming machine may be allocated to the progressive award or progressive award fund. The progressive award grows in value as more players play the gaming machine and more portions of the players' wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressives ("LAP") and wide area progressives ("WAP"), respectively.

Mystery bonus awards are also known. For instance, U.S. Pat. Nos. 5,655,961, 5,702,304, 5,741,183, 5,752,882, 5,820,459, 5,836,817, 5,876,284, 6,162,122, 6,257,981, 6,319,125, 6,364,768, 6,375,569, 6,375,567, RE37,885 and 6,565,434 describe mystery bonus awards and certain methods for providing such awards to players. Such bonus awards are classified as mystery awards because they are not based on any generated symbol or symbol combination nor is it readily apparent to the player why such bonus award(s) are provided. These patents also describe certain methods for determining which gaming machines will provide the awards to players. These patents further describe methods for a central server to determine which gaming machines will provide the bonus awards and the amounts of the bonus awards.

PCT Application No. PCT/AU98/00525, entitled "Slot Machine Game And System With Improved Jackpot Feature" discloses a jackpot awardable to a plurality of gaming machines connected to a network. Upon each play of each gaming machine, a jackpot controller increments the value of the jackpot. Prior to each primary game, the gaming machine selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine is switched into a feature game mode in which a jackpot game is played for all or part of the incremental jackpot.

More specifically, for every game that is played, a random trigger value is selected in the preprogrammed range as determined from an average number of credits wagered per jackpot. When the primary game is commenced, it is then reported to the controller, which allocates a contribution to the prize pool. Each game is also allotted numbers from the same number range from which the random number was selected, one number in the range being allotted for each credit bet such that the player's probability of being awarded the jackpot game is proportional to the bet. The previously selected random number is then used as a trigger value and compared with the values allotted to the player, if there is a match between the trigger value and the player values, the player is given an opportunity to play the jackpot game. Alternatively, a number is allocated which is equal to, or proportional to the number of credits bet in the respective primary game, the trigger value is compared with the single player value and a jackpot game awarded if the trigger value is less than or equal to the player value.

In one embodiment of the system disclosed in PCT Application No. PCT/AU98/00525, a prize is always awarded in the jackpot game. The jackpot game is used to determine the size of the prize to be awarded. The winning machine is then locked up and the controller awaits an indication that the prize has been paid before allowing the machine to be unlocked. The machine then returns to commence a new primary game. If the trigger value does not match, then there is no feature game awarded for that bought game and the machine returns to step and waits for the next game to commence.

PCT Application No. PCT/AU99/01059, entitled "Player Information Delivery" discloses a gaming console in which an animated character occasionally randomly appears and awards a player a variable random bonus prize. The occurrence of the animated character is weighted by the desired hit rate of the feature and is dependent upon the player's bet and may or may not be dependent upon the size and type of the player's bet. Additionally, the gaming console includes a bonus pool (funded by the player) and a random decision is made whether the contents of the bonus pool will be awarded in addition to any other win.

U.S. Pat. No. 6,241,608 B1 entitled "Progressive Wagering System" discloses a linked progressive wagering system that is capable of accepting wagers in different currencies and different denominations of the same currency. The system periodically computes each current prize value using the data acquired from each gaming device and displays the current prize value at each location where participating gaming devices are located (in the currency used at each particular location). This patent also discloses the system specifying a boundary criteria, such as a maximum value or an expiration date and time, for a progressive award prize. If a gaming device has not randomly generated a prize award event when the specified boundary criteria is met, a progressive award prize is forced by the system upon one or more randomly selected participating players.

While such mystery progressives are popular amongst players, a number of problems exist with these known mystery progressive systems. First, only one person wins the progressive award. This may discourage the other players who have been also been playing for a long period of time. Additionally, when a progressive award is won, the other players can only see that the progressive award has been reset. Such players often have a difficult time figuring out who won the progressive award as well as why the progressive award has been reset. Moreover, because the mathematics and funding required to maintain the mystery progressives at levels desirable to the player, such mystery progressives are often won or hit infrequently.

There is a continuing need to provide new and different gaming machines and gaming systems as well as new and different ways to provide awards to players including bonus awards. There is also a continuing need to provide new and different linked or related gaming machines.

SUMMARY

In one embodiment, the gaming system includes a central server or controller in communication with or linked to a plurality of gaming machines or gaming devices. In another embodiment, the gaming system includes a plurality of linked gaming machines wherein one of the gaming machines functions as the central server or controller.

The gaming system includes at least one and preferably a plurality of progressive awards adapted to be provided to one or more players of the gaming machines in the gaming system. In one embodiment, in addition to providing the progressive awards, the gaming system is operable to provide one or more supplemental or intermediate awards to one or more players at one or more gaming devices in the gaming system. The supplemental or intermediate awards are provided: (a) by one, more or each active gaming device between times when the progressive awards (or other gaming system maintained awards) are provided to any players at any gaming devices in the gaming system (such as during the time periods when the progressive awards are incrementing to the appropriate levels); and/or (b) by one, more or each active gaming device which does not provide one of the progressive awards when at least one of the progressive awards is provided by at least one of the gaming devices in the gaming system. It should be appreciated that in one embodiment, each supplemental or intermediate award provided to a player at a gaming device is at least partially or fully funded by that player's wagers at that gaming device and thus the supplemental awards do not reduce the funding of the progressive awards. Accordingly, such a gaming system provides for more frequent bonus awards during the extended periods of time it often takes to build one or more progressive awards to the appropriate level without otherwise affecting those progressive awards.

In one embodiment, each progressive award maintained by the central controller is associated with a range of values. In this embodiment, a bonus event will occur and one of the progressive awards will be provided to a player of a gaming device in the gaming system when that progressive award increments or increases to a value within the range of values associated with that progressive award. For example, a first progressive award is associated with a value range of $100 to $500 and a second progressive award is associated with a value range of $1,000 to $10,000. In this example, a bonus event will occur and the first progressive award will be provided to a player when the value of the first progressive award is in the range of $100 to $500. In this example, another bonus event will occur and the second progressive award will be provided to a player when the value of the second progressive award is in the range of $1,000 to $10,000. In this embodiment, the incremented progressive award value at which a bonus event will occur and the progressive award will be provided to a player of a gaming device in the gaming system (i.e., the progressive hit value) is predetermined, randomly determined, determined based on the wagers placed at the gaming devices in the gaming system, determined based on the status of one or more players (such as determined through a player tracking system), determined based on time, or determined based on any other suitable method. For example, if the central controller selects the progressive hit value of $375 for the first progressive award, then when the first progressive award increases to $375, a bonus event will occur and the first progressive award will be provided to a player at one of the gaming devices in the gaming system. In one embodiment, the first progressive award is provided to the player whose coin-in caused the first progressive award to increment to $375. In different embodiments, the coin-in is determined in any suitable manner, such as by calculating which coin-in caused the value to change to $375, by monitoring the coins-in versus the progressive award value or by calculating the coin-in value in advance based on the wagers, the progressive award hit value, and the percentage of the wagers allocated to the progressive award. For example, on a $1 wager with 0.1% allocated to the first progressive award which hits at $375, the $375{,}000^{th}$ coin wagered results in the triggering of a bonus event and the providing of the first progressive award.

In one embodiment, each gaming device in the gaming system is associated with or otherwise maintains a separate gaming device accumulated supplemental award pool. Each gaming device accumulated supplemental award pool is individually funded as a percentage of the total or partial amounts wagered at that individual gaming device. In one embodiment, each gaming device includes a separate coin-in or wager meter which tracks the total or partial coin-in or wagers placed on the primary games played at that gaming device. In another embodiment, the central controller includes: (a) a separate coin-in or wager meter for each individual gaming machine which tracks the total or partial coin-in or wagers placed on the primary games for each of the gaming machines in the gaming system (i.e., the central controller maintains a gaming device accumulated supplemental award pool for each gaming machine in the gaming system); and (b) a total or partial coin-in or wager meter which tracks the total or partial coin-in wagers placed on all of the primary games for all of the gaming machines in the gaming system. In another embodiment, the central controller maintains a separate accumulated supplemental award pool for each player which is tracked via a player tracking system (implemented through the use of a playing tracking card or any other suitable manner). In this embodiment, if a player leaves a gaming machine of the gaming system, that player's wagered amounts and accumulated supplemental award pool are saved for the player (via the player tracking system or any other suitable system or method, such as a smart card) for later use at another gaming machine. It should be appreciated that in the above described embodiments, the wagers placed are tracked in any suitable compatible or comparable manner such as credits wagered (i.e., if all of the system gaming machines are of the same denomination) or monetary units (e.g., total dollars or other currency) wagered. It should be appreciated that in one embodiment, tracking in monetary units accounts for gaming machines having multi-denominations and/or for gaming machines of different denominations and/or gaming machines which accept different currencies.

In one embodiment, the central controller determines when to provide one or more supplemental bonus events by selecting from zero to a designated number of supplemental award bonus event threshold amounts, such as zero to five values. Each selected supplemental award bonus event threshold amount represents an amount of wagers placed in the gaming system which will cause one or more bonus events to occur (in addition to any bonus events which occur when a progressive award is provided). In this embodiment, when the total or partial tracked coin-in or wagers placed on the primary games at the gaming devices in the gaming system equals, substantially equals or exceeds one of the selected supplemental award bonus event threshold amounts, the central controller will cause a separate bonus event to be triggered at a designated number of active gaming devices in the gaming system.

In one embodiment, the central controller selects zero, one or more supplemental award bonus event threshold amounts (or bonus event threshold amounts) for each of the progressive awards. For example, for the first progressive award described above, the central controller may select the two supplemental award bonus event threshold amounts of seventy and two-hundred-thirty. In this example, when the total or partial tracked wagers placed at gaming devices in the gaming system equals, substantially equals or exceeds seventy, the central controller will trigger a first bonus event and when the total or partial tracked wagers placed at gaming devices in the gaming system equals, substantially equals or exceeds two-hundred-thirty, the central controller will trigger a second bonus event. In the embodiment wherein the progressive award is provided at a specific progressive hit value, the supplemental award bonus event threshold amounts at which a bonus event may be triggered are selected from a range of zero to the progressive hit value. It should be appreciated that in this embodiment, as a bonus event will occur when the progressive award increases to the progressive hit value, the progressive hit value may be considered a supplemental award bonus event threshold amount.

In operation, the central controller or central server monitors wagers or wager activity on the primary games of the gaming machines in the gaming system. In one embodiment, based at least in part on the wagers or wager activity on the primary games of the gaming machines, the controller or central server determines when a bonus event will occur. In this embodiment, the central controller determines that a bonus event will occur when a progressive pool (i.e., the total or partial tracked wagers placed on the primary games at the gaming devices in the gaming system) equals, substantially equals or exceeds one of the selected supplemental award bonus event threshold amounts.

If the progressive pool (i.e., the total or partial tracked wagers placed) does not equal, substantially equal or exceed one of the selected supplemental award bonus event threshold amounts, the central controller determines that no bonus event will occur in this specific manner, however it should be appreciated that other bonus events associated with the gaming machines, such as conventional bonus events triggered in connection with plays of the primary games, may still occur. In this case, the central controller continues to track wager amounts at the gaming devices in the gaming system and waits a next designated interval, such as based on the suitable sampling rate, to determine if a bonus event will occur at one or more gaming devices in the gaming system.

If a bonus event is determined to occur (i.e., the central controller determines that a progressive pool reaches or is within a suitable range of one of the selected supplemental award bonus event threshold amounts), the controller or central server determines if one or more of the gaming machines will provide one or more supplemental award(s) or one or more progressive award(s) and if so, which of the gaming machine(s) will be selected to provide such award(s) in the bonus event. In one embodiment, upon the determination that a bonus event will occur, the central controller determines which gaming devices in the gaming system will provide awards to the players of those gaming devices. In one embodiment, such determination is based, at least in part, on the status of each of the gaming devices in the gaming system. In this embodiment, upon the triggering of a bonus event, each gaming machine is determined to be in either active status or enrolled/inactive status. Active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria).

In addition to determining the status of each gaming device in the gaming system, upon the occurrence of the triggering of a bonus event, the central controller determines if the tracked wagers is equal to, substantially equal to or exceeds the progressive hit value for one of the progressive awards. If the tracked wagers is not equal to, substantially equal to or exceeding the progressive hit value for one of the progressive awards, one, more or each active gaming device will display and provide an independent supplemental or intermediate award to the player of that gaming device. In one embodiment, the value associated with each supplemental award provided by each active gaming device is respectively based on the gaming device accumulated supplemental award pool for that gaming device. For example, a first active gaming device with a first gaming device accumulated supplemental award pool will provide a first supplemental award to the player of the first gaming device, wherein the value of the first supplemental award is based on the first gaming device accumulated supplemental award pool. In this example, a second active gaming device with a second gaming device accumulated supplemental award pool will provide a second supplemental award to the player of the second gaming device, wherein the value of the second supplemental award is based on the second gaming device accumulated supplemental award pool. In one embodiment, after each supplemental award is provided to the player of the appropriate active gaming device, the gaming device accumulated supplemental award pool for one, more or each active gaming device is reset to a designated amount, such as zero.

In one embodiment, each gaming device accumulated supplemental award pool for each gaming device in the gaming system is associated with a range of supplemental award percentages, such as a range from 10% to 1000%, wherein the value of the supplemental award provided by each gaming device is a percentage (selected from the associated range of percentages) of the gaming device accumulated supplemental award pool currently maintained by that gaming device. In this embodiment, each of the percentages in the range of supplemental award percentages is weighted to ensure that the theoretical average expected value of the supplemental award is equal to or substantially equal to the value currently tracked in the gaming device accumulated supplemental award pool. It should be appreciated that the supplemental award percentage may be over 100% because a supplemental award provided to a player of an active gaming device may have a value greater than the accumulated supplemental award pool associated with that gaming device.

For example, the first gaming device accumulated supplemental award pool may include forty credits and be associated with a range of supplemental award percentages from 10% to 1000%, thus the value of the first supplemental award provided to the player of the first gaming device will be in the range of four credits to four-hundred credits, wherein the range of supplemental award percentages is suitably weighted such that the theoretical average expected value of the first supplemental award is forty. In this example, the second gaming device accumulated supplemental award pool may include one-hundred-fifty credits and be associated with a range of supplemental award percentages from 10% to 1000%, thus the value of the second supplemental award provided to the player of the second gaming device will be in the range of fifteen credits to one-thousand-five-hundred credits, wherein the range of supplemental award percentages is suitably weighted such that the theoretical average expected value of the second supplemental award is one-hundred-fifty. It should be appreciated that since the value of each supplemental award is based on a percentage of the gaming device accumulated supplemental award pool, each player at one, more or each active gaming device may be provided a value less than, equal to or greater than the gaming device accumulated supplemental award pool upon each triggering of the bonus event. In different embodiments, each of the supplemental awards may be provided to the players in any suitable manner, such as via a selection game, one or more physical symbol generators (i.e., a reel or wheel) or one or more non-physical symbol generators (i.e., a video representation of a reel or wheel).

If the progressive pool (or tracked wagers in the gaming system) is equal to, substantially equal to or exceeds the progressive hit value of one of the progressive awards, then the central controller determines that such progressive award will be provided to one of the players at one of the gaming devices in the gaming system. In one embodiment, the gaming device which placed the wager that incremented the progressive pool to the progressive hit value is provided the progressive award. In different embodiments, the gaming device selected to provide the progressive award is predetermined, randomly determined, determined based on the player's wager, determined based on the player's status (such as determined through a player tracking system), determined based on a level of a jackpot award, determined based on time, or determined based on any other suitable method. When the progressive award is provided to a player, the progressive award is reset to a designated value level and zero, one or more supplemental award bonus event threshold amounts are selected for the progressive award.

In this embodiment, in addition to causing one of the gaming devices to provide the progressive award which increased to the progressive hit value, one, more or each active gaming device not selected to provide the progressive award may provide the player a percentage of the gaming device accumulated supplemental award pool for that gaming device as described above. It should be appreciated that in one embodiment, the gaming device accumulated supplemental award pool for the selected gaming device (i.e., the gaming device selected to provide the progressive award) will not be reset while the gaming device accumulated supplemental award pools for each of the non-selected active gaming devices will be reset as described above. Accordingly, this embodiment provides for a gaming system wherein at least one, a plurality of or each player that is actively playing a gaming device is provided an award, even though such award may not be the progressive award. This provides added excitement and enjoyment for players who play the gaming machines of the gaming system disclosed herein.

After providing the player at one of the gaming devices the progressive award (and also providing each of the players at zero, one or more remaining active gaming machines a supplemental award), the gaming system repeats the above described process for each of any additional progressive awards maintained by the central controller.

The gaming system and method disclosed herein contemplates employing one or more displays in conjunction with the gaming machines which will provide the players of the gaming machines information about the bonus awards to increase player awareness of these awards and interaction between players of the gaming machines. The display(s) can provide any suitable information about the gaming system, gaming machines, bonus events and bonus award such as information regarding the bonus event or bonus event award (s), which gaming machines are winning or have won supplemental awards or progressive awards, the amount of the progressive awards, and when the progressive award is about to be hit.

Accordingly, an advantage of the gaming system and method disclosed herein is to provide a gaming system and method having a plurality of gaming devices wherein multiple different supplemental bonus awards can be provided simultaneously or substantially simultaneously to players in between occurrences of when gaming system awards, such as progressive awards, are provided to players. That is, the gaming system and method disclosed herein provides for more frequent bonus awards wherein all active players participate. Such a gaming system and method breaks up the relatively long periods of time it often takes to build the progressives to the appropriate levels and enables each player who is actively playing a gaming device in the gaming system a chance at winning a progressive award.

Another advantage is to provide a gaming system and method having a plurality of gaming devices which each employ a gaming device accumulated supplemental award pool to fund the supplemental awards, wherein the individual gaming device accumulated supplemental award pools return part or all of the player's wagers back to the player. That is, by individually funding the supplemental awards at each gaming machine, the gaming system and method can implement a higher frequency of progressive events while also allowing the progressive awards to increase to levels at which players find exciting. Moreover, such a gaming system alerts each of the players at the gaming devices of the gaming system that one or more supplemental awards or one or more progressive awards are provided to the players of such gaming devices.

Additional features and advantages are described in, and will be apparent from, the following Detailed Description and the figures.

DETAILED DESCRIPTION

In one embodiment, the gaming system disclosed herein includes a plurality of supplemental or intermediate awards provided to players of the linked gaming machines in an apparently random fashion to the players of these gaming machines. These awards are referred to herein as supplemental or intermediate awards to distinguish them from the awards that the gaming machines provide to the players for winning outcomes in the plays of the primary wagering games, such as slot games, card games (e.g., poker, blackjack) or any other suitable game.

In one embodiment, the gaming devices do not provide any apparent reasons to the players for obtaining such supplemental or intermediate awards. In this embodiment, providing the supplemental awards is not triggered by an event in or based specifically on any of the plays of any primary game or on any of the plays of any secondary game of the gaming machines in the system. That is, the gaming machines may simply provide the supplemental or intermediate awards to the players without any explanation or alternatively with simple explanations.

In one embodiment, the gaming devices of the gaming system are operable to provide multiple supplemental or intermediate awards to multiple players at the multiple linked gaming devices at the same time or substantially the same time. Alternatively, the gaming devices of the gaming system are operable to provide multiple supplemental or intermediate awards to multiple players at the multiple linked gaming devices in an overlapping or sequential manner.

Figure 1:
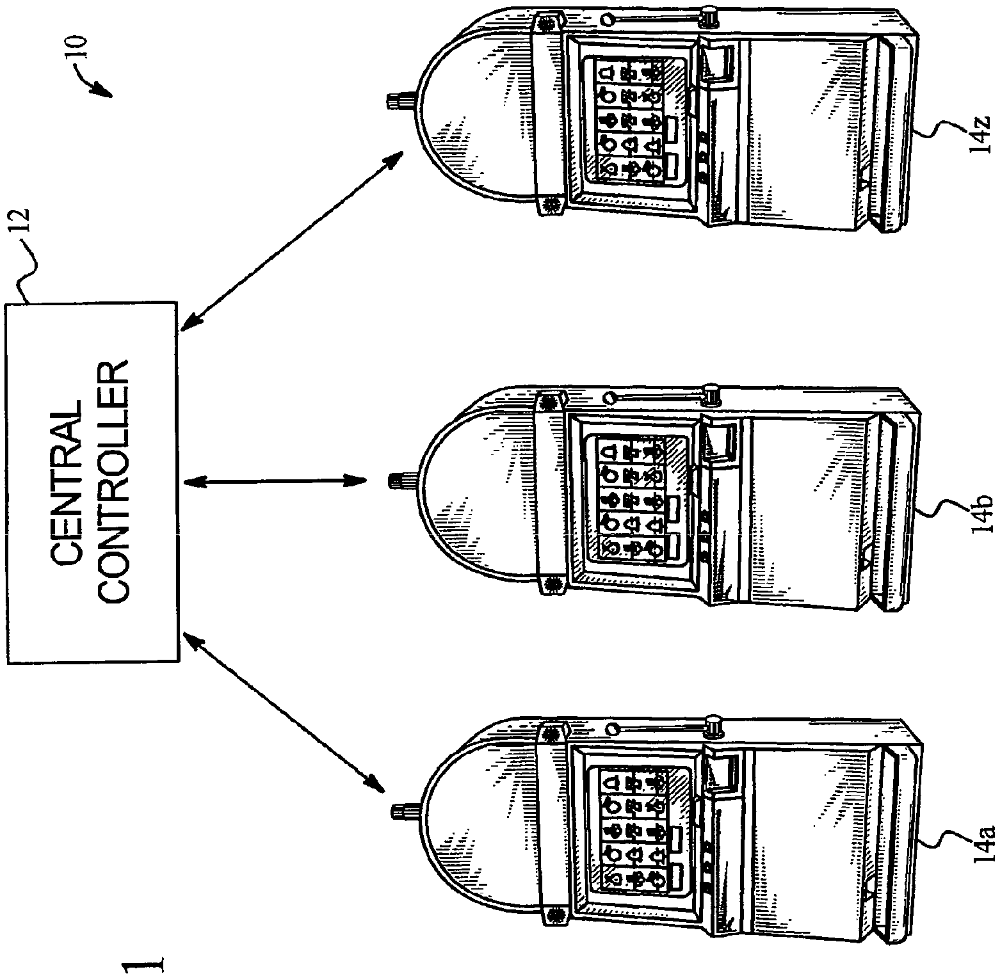
FIG. 1 is a schematic diagram of the central server in communication with a plurality of gaming machines in accordance with one embodiment of the gaming system disclosed herein.

Referring to FIG. 1, one embodiment of the gaming system 10 includes a central server or controller 12 and a plurality of gaming machines or gaming devices 14*a*, 14*b* . . . 14*z* in communication with or linked to the central server or processor 12 through a data network or a remote communication link. The linked gaming machines may be of the same type or of different types of gaming machines. The linked gaming machines may have the same primary game or two or more different primary games.

The number of gaming machines in the gaming system can vary as desired by the implementer of the gaming system. These gaming machines are referred to herein alternatively as the group of gaming machines, the linked gaming machines or the system gaming machines. The play of each of the gaming machines 14*a*, 14*b* . . . 14*z* in the group is monitored by the central server 12. That is, the central server or controller maintains or keeps track of the play and/or other activity on or relating to the gaming machines in the gaming system. In one embodiment, the central server keeps track of the play on each gaming machine 14*a*, 14*b* . . . 14*z* including at least: (1) the amount wagered by the player(s) for each play of the primary game for each gaming machine (i.e., a total or partial coin-in or wager meter which tracks the total or partial coin-in wagers placed on all of the primary games for all of the gaming machines in the gaming system); and (2) the time the wagers are placed or the amount of time between each play of the primary game for each gaming machine. It should be appreciated that the player of a gaming machine may change during this tracking and that this tracking can be independent of the specific player playing the gaming machine. In one embodiment, as described below, the central server determines the status of each of the gaming machines in the group based on this information. It should be appreciated that other information may be employed by the central server or controller to determine the status of each of the gaming machines in the group. For instance, the number of games played or the amount of each wager placed on each play may be used in the determination of the status of each gaming machine. The central server or controller may be any suitable server or computing device which includes a processor and a memory or storage device. In alternative embodiments, the central server is a progressive controller or another gaming machine in the gaming system. The terms central server and controller are used interchangeably herein.

Figure 2A:
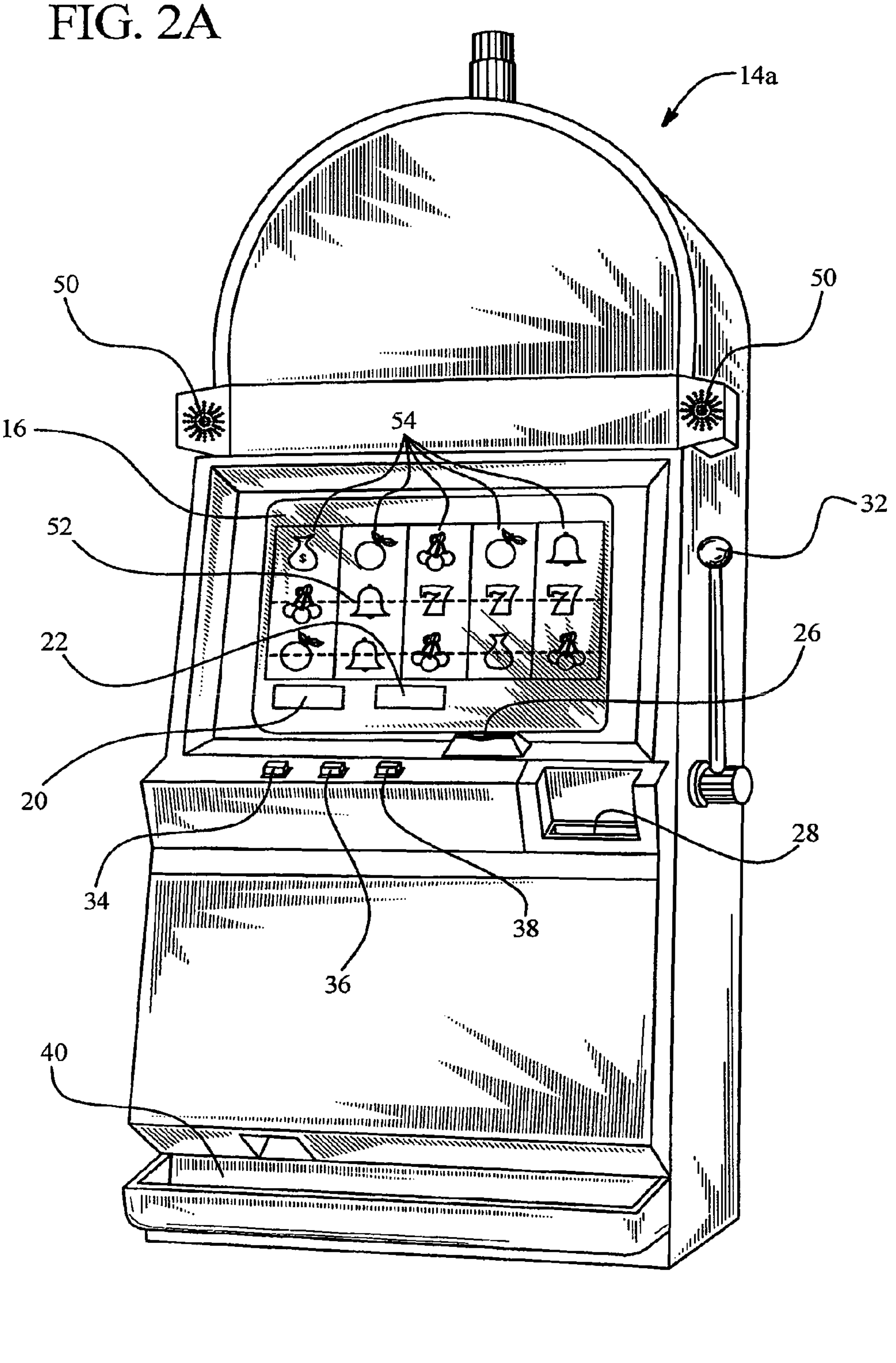
FIGS. 2A and 2B are front perspective views of alternative embodiments of gaming devices disclosed herein.
Figure 2B:
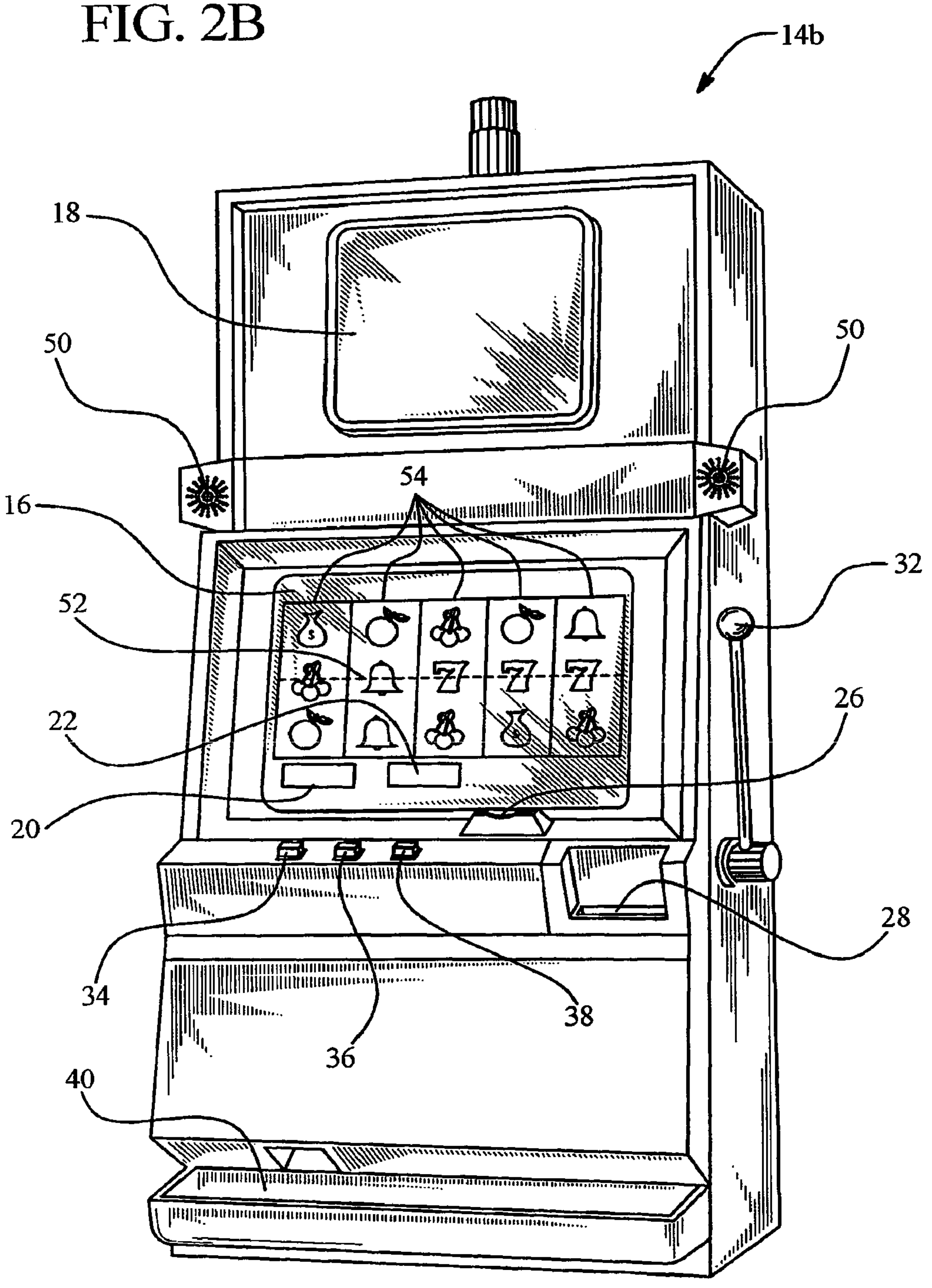

Two alternative embodiments of the gaming devices of the gaming system are illustrated in FIGS. 2A and 2B as gaming device 14*a* and gaming device 14*b*, respectively. Gaming device 14*a* and/or gaming device 14*b* are generally referred to herein as gaming device 14.

In one embodiment, as illustrated in FIGS. 2A and 2B, gaming device 14 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 2A and 2B, the gaming device may have varying cabinet and display configurations.

Figure 3:
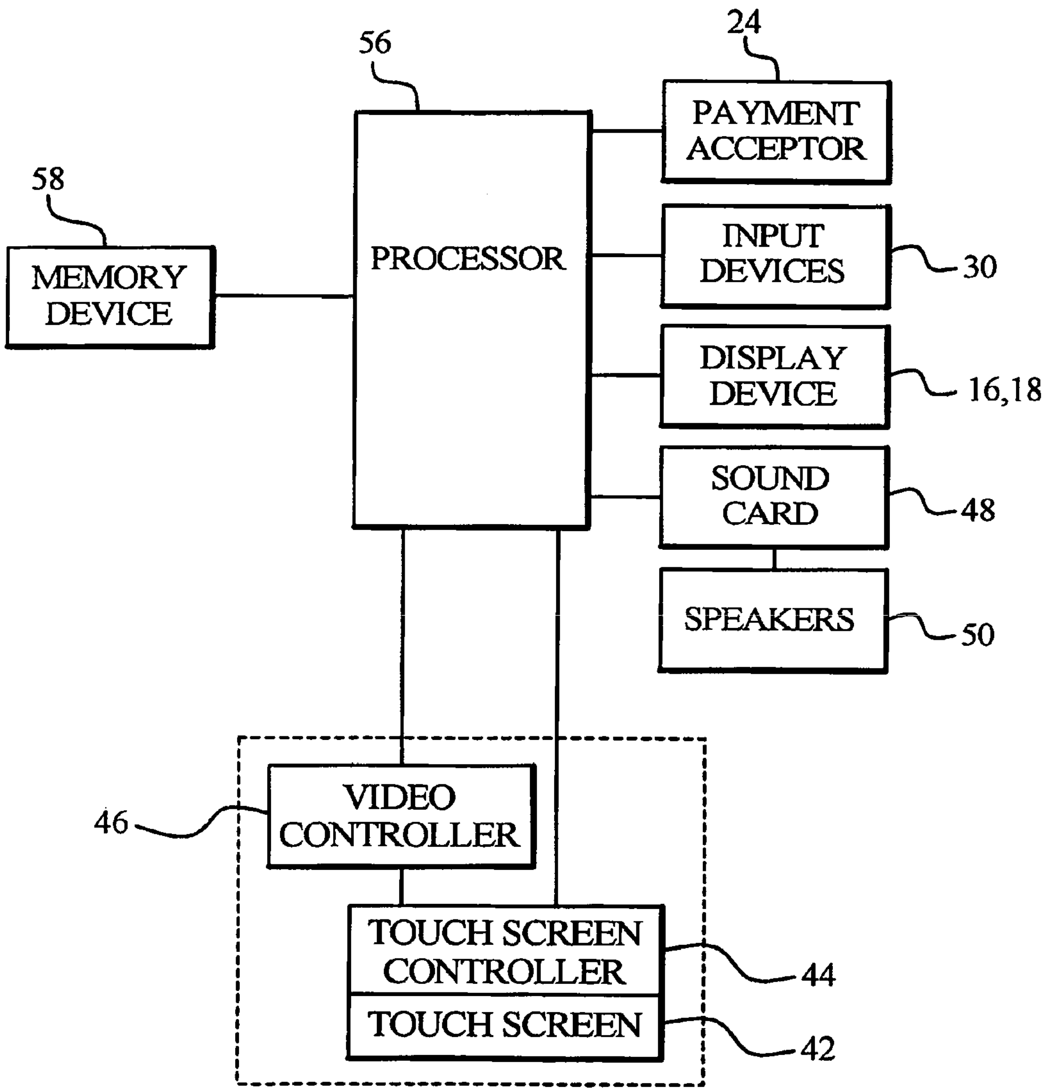
FIG. 3 is a schematic block diagram of the electronic configuration of one embodiment of a gaming device disclosed herein.

In one embodiment, as illustrated in FIG. 3, the gaming device preferably includes at least one processor 56, such as a microprocessor, a microcontroller-based platform, a suitable integrated circuit or one or more application-specific integrated circuits (ASIC's). The processor is in communication with or operable to access or to exchange signals with at least one data storage or memory device 58. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG) or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 3, the gaming device includes one or more display devices controlled by the processor. The display devices are preferably connected to or mounted to the cabinet of the gaming device. The embodiment shown in FIG. 2A includes a central display device 16 which displays a primary game. This display device may also display any secondary game associated with the primary game as well as information relating to the primary or secondary game. The alternative embodiment shown in FIG. 2B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 2A and 2B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 3, in one embodiment, the gaming device includes at least one payment acceptor 24 in communication with the processor. As seen in FIGS. 2A and 2B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 2A, 2B and 3, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 2A and 2B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 3, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 3, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 14 can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, as illustrated in FIGS. 2A and 2B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern, occur on the requisite number of adjacent reels and/or occur in a scatter pay arrangement.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 2A and 2B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

In one embodiment, the game outcome provided to the player is determined by the central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a “daub” button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a intermittent award in addition to any award provided for winning the bingo game as described above. In this embodiment, if one or more elements are marked in intermittent patterns within a designated number of drawn elements, a intermittent award or value associated with the marked intermittent pattern is provided to the player as part of the predetermined game outcome. For example, if the four corners of a bingo card are marked within the first twenty selected elements, an intermittent award of $10 is provided to the player as part of the predetermined game outcome. It should be appreciated that in this embodiment, the player of a gaming device may be provided an intermittent award regardless of if the enrolled gaming device's provided bingo card wins or does not win the bingo game as described above.

In another embodiment, one or more of the gaming devices are in communication with the central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, one or more gaming devices are in communication with the central server or controller. In one embodiment, the memory device of the central controller stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a "chip" to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

Progressive Awards

In one embodiment, a plurality of gaming devices at one or more gaming sites are networked to the central server in a progressive configuration, wherein a portion of each wager placed is allocated to one or more progressive awards. In one embodiment, the progressive awards are associated with the system gaming machines which each contribute portions of the progressive awards. The multiple gaming machines may be in the same bank of machines, in the same casino or gaming establishment such as through LAN or in two or more different casinos or gaming establishments such as through a WAN.

In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state. In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

In one embodiment, the central server or other central controller determines when a progressive win is triggered. In this embodiment, a central controller and an individual gaming machine work in conjunction with each other to determine when a progressive win is triggered, for example through an individual gaming machine meeting a predetermined requirement established by the central controller. In another embodiment, an individual gaming machine may trigger a progressive win.

In one embodiment, the progressive awards start at different levels such as $10, $100, $1000 and $10,000 and increment or increase until provided to a player. The progressive awards accumulate based on a small percentage (such as 0.1%) of coin-in or wagered amounts in a conventional manner. In one embodiment, the percentage that goes to each progressive award is equal (such as 0.1% to each of four progressive awards). In other embodiments, two or more of the progressive awards may be funded by different percentages. In these embodiments, the central server continues to increase the progressive levels until a progressive award is provided to a player (upon the occurrence of a bonus event), at which point another progressive award starts incremented from the appropriate progressive award level.

In one alternative embodiment, the gaming devices require an additional wager to fund the progressives awards. For example, the plurality of progressive awards are funded, at least partially, via a side-bet or side-wager which the player may make (and which is tracked via a side-bet meter). In one embodiment, the progressive awards are funded with only side-bets or side-wagers placed. In another embodiment, the progressive awards are funded based on player's wagers as described above as well as any side-bets or side-wagers placed. In another embodiment, a gaming machine can only be active, as described below, if such additional wager is made by the player. In this embodiment, a side-bet or side-wager must be placed (and tracked via a side-bet meter) at a gaming device of the gaming system for that gaming device to be classified as in the active state.

Figures 4, 5:
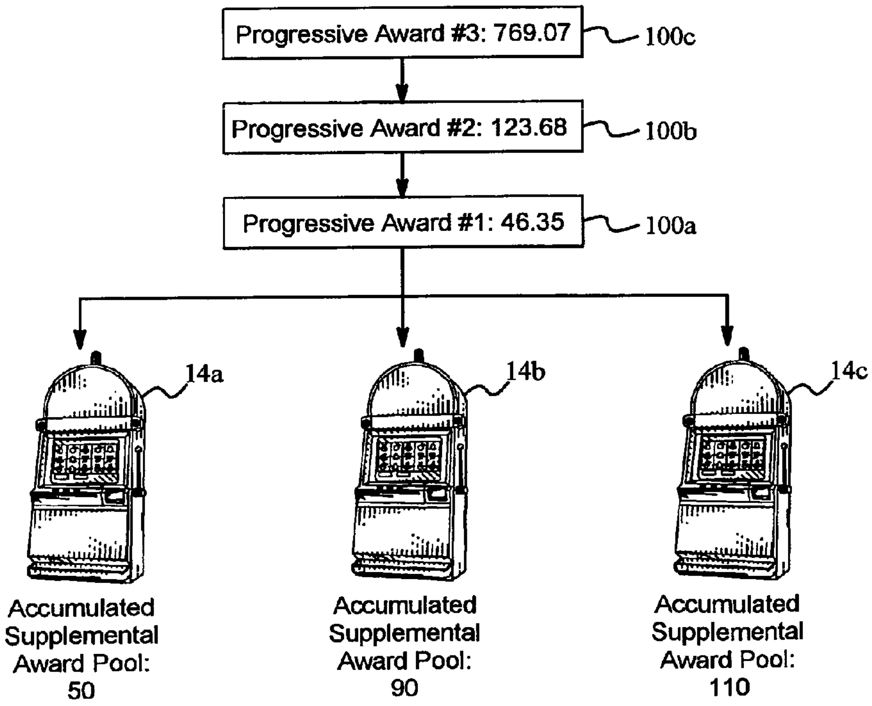
FIG. 4 is a chart illustrating each of a plurality of progressive awards and the supplemental award bonus event threshold amounts associated with each progressive award.
FIG. 5 is a schematic diagram of the plurality of gaming devices in the gaming system and the plurality of progressive awards maintained by the gaming system.

In one embodiment, each progressive award or progressive level is associated with a range of values, wherein each progressive award will be provided to a player of a gaming device in the gaming system when the progressive award increments to a progressive award hit value within the range of values associated with that progressive award. In different embodiments, the progressive award hit value at which the progressive award is provided to one of the players is predetermined, randomly determined, determined based on the wagers placed in the gaming system, determined based on the status of one or more players (such as determined through a player tracking system), determined based on time, or determined based on any other suitable method. For example, as illustrated in FIG. 4, a first progressive award 100*a* is associated with a value range of $10 to $100, a second progressive award 100*b* is associated with a value range of $50 to $250, and a third progressive award 100*c* is associated with a value range of $100 to $1,000. In this example, a bonus event will occur and the first progressive award will be provided to a player when the value of the first progressive award is in the range of $10 to $100, another bonus event will occur and the second progressive award will be provided to a player when the value of the second progressive award is in the range of $50 to $250 and another bonus event will occur and the third progressive award will be provided to a player when the value of the third progressive award is in the range of $100 to $1,000.

In one embodiment, a plurality of the progressive awards are associated with different value ranges. In another embodiment, each of the progressive awards is associated with a different value range. In another embodiment, a plurality of the progressive awards are associated with the same value range.

Gaming Device Accumulated Supplemental Award Pools

In one embodiment, each gaming device in the gaming system is associated with or otherwise maintains a separate gaming device accumulated supplemental award pool. In this embodiment, each gaming device accumulated supplemental award pool is individually funded as a percentage of the total amounts wagered at that individual gaming device. That is, similar to the funding of each progressive level, each gaming device accumulated supplemental award pool starts at a designated level, such as $0 and increases or accumulates based on a small percentage (such as 0.1%) of coin-in or wagered amounts at that gaming device. For example, as illustrated in FIG. 5, a first gaming device 14*a* is associated with a first gaming device accumulated supplemental award pool with 50 accumulated monetary units, a second gaming device 14*b* is associated with a second gaming device accumulated supplemental award pool with 90 accumulated monetary units and a third gaming device is associated with a third gaming device accumulated supplemental award pool with 110 accumulated monetary units.

In one embodiment, each gaming device includes a separate coin-in or wager meter which tracks the total or partial coin-in or wagers placed on the primary games played at that gaming device. In another embodiment, the central controller includes a separate coin-in or wager meter for each individual gaming machine which tracks the total or partial coin-in or wagers placed on the primary games for each of the gaming machines in the gaming system (i.e., the central controller maintains a gaming device accumulated supplemental award pool for each gaming machine in the gaming system). It should be appreciated that the wagers placed are tracked in any suitable compatible or comparable manner such as credits wagered (i.e., if all of the system gaming machines are of the same denomination), monetary units (e.g., total dollars or other currency) wagered or as a percentage of the amounts wagered. It should be appreciated that tracking in monetary units accounts for gaming machines having multi-denominations and/or for gaming machines of different denominations and/or gaming machines which accept different currencies.

In one embodiment, the relative amount of the wager meters for the gaming machines vary based on other factors such as the desire to reward a player who has a higher gaming status than other players. For instance, if a player has a higher level player tracking card, the player may be provided more monetary units in the gaming device accumulated supplemental award pool of the gaming device which the player is playing. Thus, in one embodiment, the gaming device accumulated supplemental award pool for a gaming machine may be set or reset to a seed amount or to include a seed amount based on the status of the player or one or more other factors. Alternatively, credits or monetary units may be added to the players wagered amounts to give a player an advantage.

In another embodiment, the central controller maintains a separate accumulated supplemental award pool for each player which is tracked via a player tracking system (implemented through the use of a playing tracking card or any other suitable manner). That is, the wagers are accumulated based on individual players instead of gaming machines. In this embodiment, the gaming system is configured to track each player's wagers and base any supplemental awards, as described below, on the player's individual accumulated supplemental award pools. In this embodiment, if a player leaves the gaming machine of the gaming system, that player's wagered amounts are saved for the player for later use at another gaming machine. In one embodiment, if the player leaves a gaming machine of the gaming system, the player's wagers are retained through the playing tracking system or the player tracking card until a designated time or event. In another embodiment, if the player leaves a gaming machine of the gaming system without transferring the wagers allocated to their personal individual accumulated supplemental award pool using the player tracking system (e.g., the player is not registered in the player tracking system or the player does not have a playing tracking card), the gaming system sets certain criteria which must be fulfilled to reset their individual accumulated supplemental award pool.

Determination of Bonus Events

In one embodiment, the central controller determines when to provide one or more bonus event awards by selecting from zero to a designated number of supplemental award bonus event threshold amounts (or bonus event threshold amounts), such as zero to five values. In one embodiment, the central controller selects zero, one or more supplemental award bonus event threshold amounts for each of the progressive awards. Each selected supplemental award bonus event threshold amount represents an amount of wagers placed in the gaming system which will cause the triggering of a bonus event at one or more gaming devices in the gaming system. In this embodiment, when the total or partial tracked coin-in or wagers placed on the primary games at the gaming devices in the gaming system equals, substantially equals or exceeds one of the selected supplemental award bonus event threshold amounts, the central controller will cause a separate bonus event to be triggered at one, more or each active gaming device in the gaming system. In the embodiment wherein the progressive award is provided at a specific progressive hit value, the supplemental award bonus event threshold amounts at which a supplemental bonus event may be triggered are selected from a range of zero to the progressive hit value. It should be appreciated that in this embodiment, as a bonus event will occur when the progressive award increases to the progressive hit value, the progressive hit value may be considered a supplemental award bonus event threshold amount. It should be appreciated that when a progressive award is provided to a player at a gaming device in the gaming system, one or more supplemental awards may or may not be provided to different players at different gaming devices in the gaming system.

Figure 6:
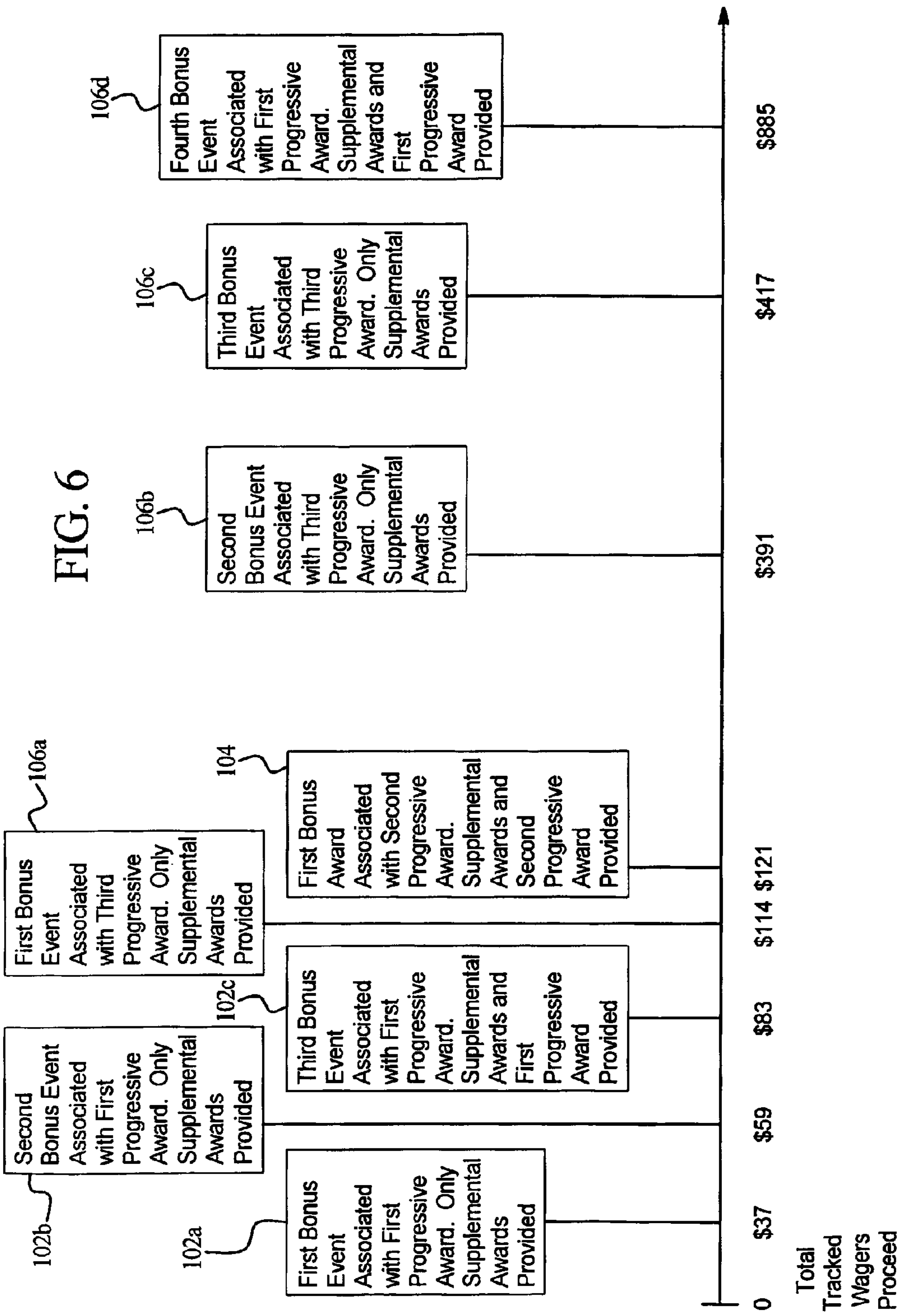
FIG. 6 is a timeline illustrating the occurrences of the bonus events relative to the tracked wagers placed at the gaming devices in the gaming system disclosed herein.

For example, as illustrated in FIG. 4, for the first progressive award, the central controller may select the two supplemental award bonus event threshold amounts of $37 and $59. Accordingly, in this example, as illustrated in FIG. 6, when the tracked wagers placed at gaming devices in the gaming system equals, substantially equals or exceeds $37, the central controller will trigger a bonus event (as indicated by block 102*a*), when the tracked wagers placed at gaming devices in the gaming system equals, substantially equals or exceeds $59, the central controller will trigger another bonus event (as indicated by block 102*b*) and when the tracked wagers placed at gaming devices in the gaming system equals, substantially equals or exceeds $83 (i.e., the first progressive award hit value), the central controller will trigger another bonus event (as indicated by block 102*c*). As seen in FIG. 4, the central controller did not select any supplemental award bonus event threshold amounts for the second progressive award and thus no bonus events will be triggered in association with the building of the second progressive award. It should be appreciated that, as described below and illustrated in FIG. 6, a bonus event (as indicated by block 104) will be triggered in association with the progressive hit value of $121 associated with the second progressive award. As further illustrated in FIG. 4, the central controller selected the three supplemental award bonus event threshold amounts of $114, $391, and $417 for the third progressive award. Accordingly, for this example, as illustrated in FIG. 6, when the tracked wagers placed at gaming devices in the gaming system equals, substantially equals or exceeds $114, the central controller will trigger a bonus event (as indicated by block 106*a*), when the tracked wagers placed at gaming devices in the gaming system equals, substantially equals or exceeds $391, the central controller will trigger another bonus event (as indicated by block 106*b*), when the tracked wagers placed at the gaming devices in the gaming system equals, substantially equals or exceeds $417, the central controller will trigger another bonus event (as indicated by block 106*c*) and when the tracked wagers placed at gaming devices in the gaming system equals, substantially equals or exceeds $885 (i.e., the third progressive award hit value), the central controller will trigger another bonus event (as indicated by block 106*d*).

In another embodiment, the central controller selects one or more supplemental award bonus event threshold amounts for one or more non-progressive awards, such as the top awards which may be provided to the players of the gaming devices in the gaming system. In another embodiment, the central controller selects a plurality of supplemental award bonus event threshold amounts independent of the progressive awards maintained by the gaming system. In this embodiment, each progressive award is not associated with zero, one or more supplemental award bonus event threshold amounts, but the progressive awards of the gaming system are cumulatively associated with zero, one or more supplemental award bonus event threshold amounts. It should be appreciated that in this embodiment, at designated interval, the central controller will reselect zero, one or more supplemental award bonus event threshold amounts. For example, after an elapsed amount of time or wagers placed, the central controller will reselect zero, one or more supplemental award bonus event threshold amounts. In another example, when one or more of the progressive awards are provided, the central controller will reselect zero, one or more supplemental award bonus event threshold amounts.

In one embodiment, the central controller selects at least one supplemental award bonus event threshold amount for at least one progressive award. In another embodiment, the central controller selects at least one supplemental award bonus event threshold amount for a plurality of progressive awards. In another embodiment, the central controller selects at least one supplemental award bonus event threshold amount for each progressive award. In one embodiment, the central controller selects a plurality of supplemental award bonus event threshold amounts for at least one progressive award. In another embodiment, the central controller selects a plurality of supplemental award bonus event threshold amounts for a plurality of progressive awards. In another embodiment, the central controller selects a plurality of supplemental award bonus event threshold amounts for each progressive award.

In one embodiment, a plurality of the selected supplemental award bonus event threshold amounts are different. In another embodiment, each of the selected supplemental award bonus event threshold amounts are different. In different embodiments, the number of supplemental award bonus event threshold amounts selected for each progressive award is predetermined, randomly determined, determined based on the wagers placed in the gaming system, determined based on the status of one or more players (such as determined through a player tracking system), determined based on time, determined based on the level of each progressive award, or determined based on any other suitable method.

Figure 7:
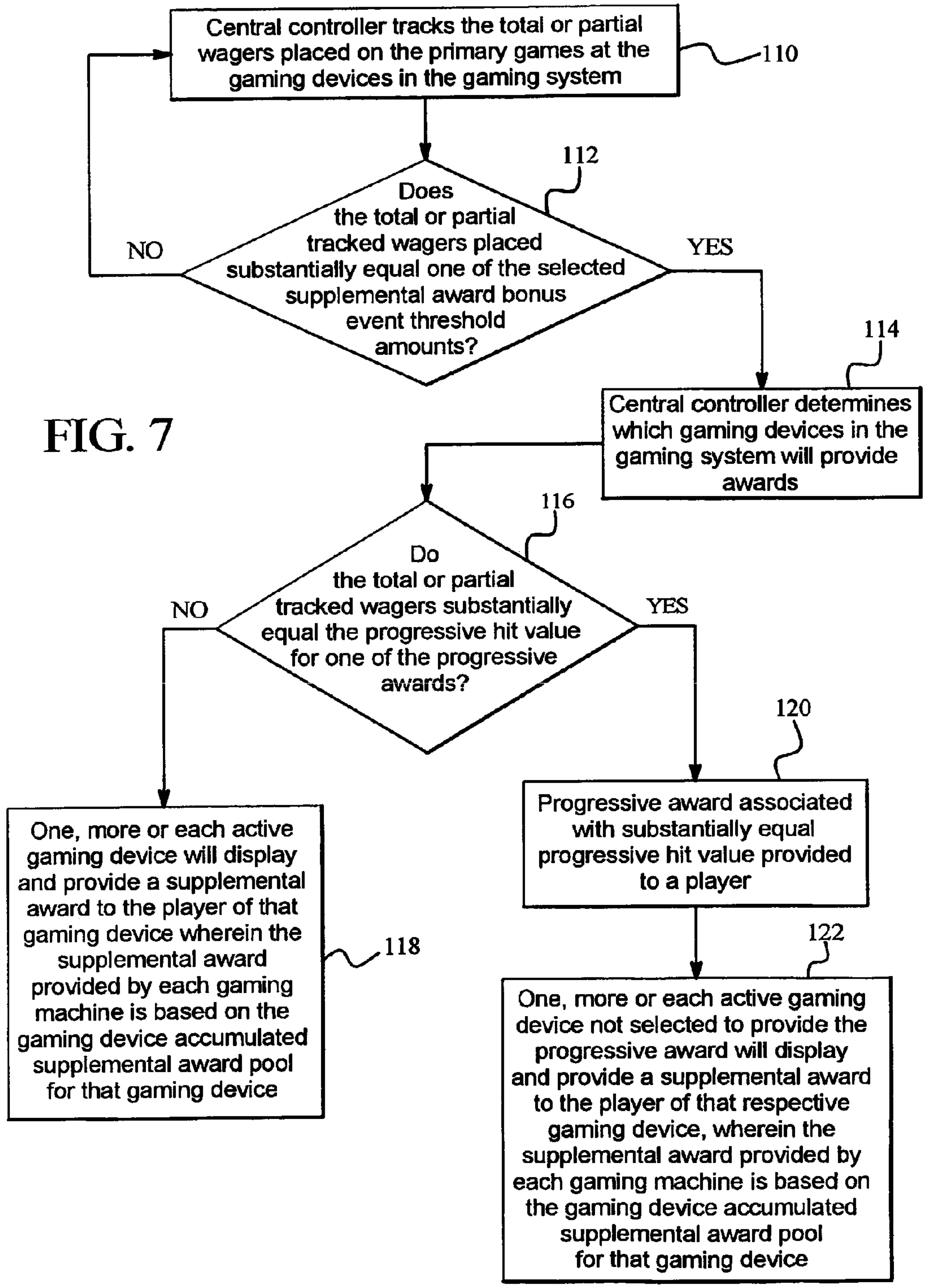
FIG. 7 is a flowchart of a one embodiment of the gaming system disclosed herein illustrating the triggering of a bonus event to the providing of one or more supplemental bonus awards.

In operation of this embodiment, the central controller tracks the total (or partial) wagers placed on the primary games at the gaming devices in the gaming system as indicated in block 110 of FIG. 7. The central controller determines when a bonus event will occur by determining if the total (or partial) tracked coin-in or wagers placed on the primary games at the gaming devices in the gaming system equals, substantially equals or exceeds one of the selected supplemental award bonus event threshold amounts as indicated in diamond 112. In this embodiment, the central controller determines if one of the progressive awards or pools equals, substantially equals or exceeds one of the selected supplemental award bonus event threshold amounts. In one embodiment, the central controller determines if a bonus event will occur at preset intervals based on a suitable sampling rate. The sampling rate can be based on any suitable criteria, such as amounts wagered, time elapsed or one or more other factors. For example, where the sampling rate is based on the amount wagered, at each predetermined interval, the central server determines if the tracked wagers placed at least equals, substantially equals or exceeds one of the selected supplemental award bonus event threshold amounts.

If the total or partial tracked wagers placed does not at least equal, substantially equal or exceeds one of the selected supplemental award bonus event threshold amounts, the central controller determines that no bonus event will occur. In this case, the central controller continues to track wagered monetary units (as indicated in block 110) and waits until the next interval (i.e., based on the suitable sampling rate) to determine if a bonus event will occur at one or more gaming machines in the gaming system.

If the central controller determines that the total or partial tracked wagers placed equals, substantially equals or exceeds one of the selected supplemental award bonus event threshold amounts, (i.e., upon the triggering of a bonus event), the central controller determines which gaming devices in the gaming system will provide awards to the players of those gaming devices as indicated in block 114. Such determination is based, at least in part, on the status of each of the gaming devices in the gaming system. In one embodiment, the status of each gaming machine in the gaming system as either enrolled or inactive status or active status determines whether that gaming machine is eligible to be selected to provide a supplemental or progressive award in a bonus event. In one embodiment, the status of each gaming machine in the gaming system when the bonus event occurs also determines the number of supplemental awards provided in the bonus event. For example, the central controller determines that gaming machine 14*a* and gaming machine 14*z* are in active status (and thus eligible to be selected to provide a supplemental or progressive award in a bonus event) and gaming machine 14*b* is in inactive status.

The enrolled or inactive status means that the gaming machine is one of the linked gaming machines in the system, but is not being actively played by a player during a bonus event qualification period. A gaming machine may be classified as enrolled status for several reasons. For example, no player may be playing the gaming machine. In another example, a player could be playing the gaming machine (i.e., by having credits on the gaming machine), but be playing too slowly or be interrupted during play. In this case, the player could have credits on the credit meter of the gaming machine, but the player has not made a wager on a primary game or otherwise qualified for a bonus event during the bonus event qualification period.

The active status means that the gaming machine is being actively played by a player during a bonus event qualification period. In one embodiment, actively playing during a bonus event qualification period means that the player is playing the primary game of the gaming machine (i.e., placing wagers on plays of the primary game) at least at a predefined minimum rate during a predefined time period. For example, the gaming machine may be in active status when a player has made at least one play of the primary game in a fifteen second period prior to the triggering of the bonus event. In this example, the bonus event qualification period is that fifteen second period prior to the triggering of the bonus event.

In another embodiment, the active status may alternatively or additionally be based on the amount wagered on the plays of the primary game during a bonus event qualification period. In a further alternative embodiment, the determination of the active status may be based on a designated minimum number of plays of the primary game or number of wagers on the primary game in a designated time period. The determination of active status may take into account other factors such as interruptions or displays in play of the primary game such as caused by the triggering of other bonuses or the operation of other secondary games of the gaming machines. In another embodiment, a gaming machine can only be determined to be an active gaming machine if an additional wager, such as a side-bet or side-wager, is made by a player at a gaming machine of the gaming system for one player of a game, a plurality of plays of a game or all plays of a game in a designed period of time, such as a designed time period. It should be appreciated that a gaming machine may be classified as active based on any one or more suitable parameters or criteria as determined by the implementer or operator of the gaming system.

Additionally, it should be appreciated that the gaming system and method disclosed herein contemplates other or additional methods for determining that a gaming machine is active. For instance, the player may be enabled to make a side wager or additional wager to be active for one or more subsequent bonus events. The side wager feature could also be time based where the additional wager causes the gaming machine to be active for a subsequent time period, such as one minute.

In another alternative embodiment, a minimum wager level is required for a gaming machine to qualify to be selected to obtain one of the supplemental awards. In one embodiment, this minimum wager level is the maximum wager level for the primary game in the gaming machine. This requirement is in addition to the requirement that the gaming machine be active to qualify for the determination of which gaming machine will be selected to obtain a supplemental award or one of the progressive awards. Another method for determining if the gaming machine is active is whether or not the player has wagered a minimum level of monetary units since the occurrence of the last bonus event.

It should also be appreciated that one or more additional statuses may be employed. In one embodiment, a participating status is provided for a gaming machine based on a determination of whether the gaming machine will be part of the bonus event or be eligible to be selected to provide a supplemental award to the player of that gaming machine. For instance, a gaming machine will be in a participating status if an individual player playing the gaming machine is a premier player. This could be determined at least in part based on the status of that player determined via a player tracking system and player tracking card used by that player in the gaming machine. It should be appreciated that other criteria can be used to determine if a player is in the participating status. It should be further appreciated that when a gaming machine is in the participating status, the gaming system automatically treats the gaming machine as an active gaming machine for purposes of the other determinations including bonus event eligibility by the gaming system.

In addition to determining the status of each gaming device in the gaming system, if a bonus event is triggered (i.e., the total or partial tracked wagers placed equals, substantially equals or exceeds one of the selected supplemental award bonus event threshold amounts or the progressive award hit value), the central controller determines if the total or partial tracked wagers for the gaming system is equal to, substantially equal to or exceeds the progressive hit value for one of the progressive awards as indicated in diamond 116 of FIG. 7. That is, the central controller determines if at least one of the progressive awards or pools is equal to, substantially equal to or exceeds the progressive hit value for one of the progressive awards.

If the tracked wagers is not equal to, substantially equal to or exceeds one of the progressive hit values (i.e., if at least one of the progressive awards or pools is not equal to, substantially equal to or exceeds the progressive hit value for one of the progressive awards), then one, more or each active gaming device will display and provide a supplemental or intermediate award to the player of that gaming device as indicated in block 118. For example, when the tracked wagers placed at gaming devices in the gaming system equals, substantially equals or exceeds the selected supplemental award bonus event threshold amount of $37 and a bonus event associated with the first progressive award is triggered, the central controller determines that since the total or partial tracked wagers placed at gaming devices in the gaming system is less than the progressive award hit value of $83 for the first progressive award (and none of the other progressive hit values are $37), active gaming devices 14*a* and 14*z* will each display and provide a supplemental or intermediate award to the player of that gaming device.

In one embodiment, the value associated with each supplemental award provided by one, more or each active gaming device is based on the gaming device accumulated supplemental award pool for that gaming device (or the accumulated supplemental award pool associated with a player through the player tracking system). For example, a first active gaming device with a first gaming device accumulated supplemental award pool will provide a first supplemental award to the player of the first gaming device, wherein the value of the first supplemental award is based on the first gaming device accumulated supplemental award pool. In this example, a second active gaming device with a second gaming device accumulated supplemental award pool will provide a second supplemental award to the player of the second gaming device, wherein the value of the second supplemental award is based on the second gaming device accumulated supplemental award pool. In one embodiment, after each supplemental award is provided to the player of the appropriate active gaming device, the gaming device accumulated supplemental award pool for one, more or each active gaming device is reset to a designated amount, such as zero. In different embodiments, each of the supplemental awards may be provided to the players in any suitable manner, such as via a selection game, one or more physical symbol generators (i.e., a reel or wheel) or one or more non-physical symbol generators (i.e., a video representation of a reel or wheel).

In one embodiment, each gaming device accumulated supplemental award pool for each gaming device in the gaming system is associated with a range of supplemental award percentages, such as a range from 10% to 1000%, wherein the value of the supplemental award provided by each gaming device is a percentage (selected from the associated range of supplemental award percentages) of the gaming device accumulated supplemental award pool currently maintained by that gaming device. In this embodiment, each of the percentages in the range of supplemental award percentages is weighted to ensure that the theoretical average expected value of the value of the supplemental award is equal to, substantially equal to or exceeds the value currently tracked in the gaming device accumulated supplemental award pool.

For example, as illustrated in FIG. 5, the gaming device accumulated supplemental award pool for active gaming device 14*a* includes fifty credits (and is associated with a range of supplemental award percentages from 10% to 1000%), thus the value of the supplemental award provided to the player of gaming device 14*a* will be in the range of five credits to five-hundred credits, wherein the range of percentages is suitably weighted such that the theoretical average expected value of this supplemental award is fifty. Additionally, the gaming device accumulated supplemental award pool for active gaming device 14*z* includes one-hundred-ten credits (and is associated with a range of supplemental award percentages from 10% to 1000%), thus the value of the supplemental award provided to the player of gaming device 14*z* will be in the range of eleven credits to one-thousand-one-hundred credits, wherein the range of percentages is suitably weighted such that the theoretical average expected value of this supplemental award is one-hundred-ten. It should be appreciated that since the value of each supplemental award is based on a percentage of the gaming device accumulated supplemental award pool, each player at one, more or each active gaming device may be provided a value less than, equal to or greater than the gaming device accumulated supplemental award pool upon each triggering of the bonus event.

In one embodiment, a plurality of gaming devices are each associated with a different range of supplemental award percentages. In another embodiment, each gaming device is associated with a different range of supplemental award percentages. In another embodiment, a plurality of gaming devices are each associated with the same range of supplemental award percentages. In another embodiment, each gaming device is associated with the same range of supplemental award percentages. In different embodiments, the supplemental award ranges of percentages associated with each gaming device are predetermined, randomly determined, determined based on the wagers placed in the gaming system, determined based on the status of one or more players (such as determined through a player tracking system), determined based on the level of one or more progressive awards, determined based on time, or determined based on any other suitable method. It should be appreciated that any suitable manner of determining one or more supplemental awards may be employed.

if the total or partial tracked wagers in the gaming system is equal to, substantially equal to or exceeds one of the progressive hit values, then that progressive award will be provided to a player as indicated in block 120 of FIG. 7. That is, if at least one of the progressive awards or pools is equal to, substantially equal to or exceeds the progressive hit value for one of the progressive awards, then that progressive award or pool is provided to a player. In one embodiment, the gaming device which placed the wager that incremented the progressive pool to the progressive hit value is provided the progressive award. In different embodiment, the gaming device selected to provide the progressive award is predetermined, randomly determined, determined based on the player's wager, determined based on the player's status (such as determined through a player tracking system), determined based on a level of a jackpot award, determined based on time, or determined based on any other suitable method. It should be appreciated that when the progressive award is provided to a player, the progressive award is reset to a designated value level and zero, one or more supplemental award bonus event threshold amounts are selected in association with the reset progressive award.

In this embodiment, in addition to causing one of the gaming devices to provide a progressive award, one, more or each active gaming device not selected to provide the progressive award proceeds with providing the player a supplemental award as indicted in block 122. In one embodiment, the supplemental awards provided are a percentage of the gaming device accumulated supplemental award pool for that gaming device as described above. It should be appreciated that the gaming device accumulated supplemental award pool for the gaming device selected to provide the progressive award will not be reset while the gaming device accumulated supplemental award pools for each of the non-selected active gaming devices will be reset as described above. Accordingly, this embodiment provides for a gaming system wherein each player that is actively playing a gaming device is provided an award, even though such award may not be the progressive award.

For example, since the second progressive award is not associated with any supplemental award bonus event threshold amounts, the only bonus event associated with the second progressive award will occur when the tracked wagers placed equals, substantially equals or exceeds the progressive award hit value of $121 for the second progressive award. Upon the triggering of this bonus event, one of the active gaming machines will be selected to provide the second progressive award and each of any remaining active gaming machines will each provide a supplemental award which is based on the gaming device accumulated supplemental award pool for that gaming device.

In one embodiment, the progressive awards and supplemental awards are provided to the player via a selection game. In one embodiment, each active gaming device determined to provide a supplemental award will display a plurality of selections. Each selection is associated with a supplemental award which is based on that gaming device's accumulated supplemental award pool and the associated range of supplemental award percentages. In this embodiment, the gaming device enables a player to pick one of the selections and the supplemental award associated with the picked selection is provided to the player. Moreover, if the central controller determines that one of the gaming devices will provide a progressive award, then such gaming device displays a plurality of selections wherein each selection is associated with the progressive award to be provided. In this embodiment, the gaming device enables a player to pick one of the selections and regardless of which selection is picked, the progressive award associated with the picked selection is provided to the player. In one embodiment, the supplemental awards and the progressive awards are displayed to the player in the same or a similar gaming sequence. In another embodiment, the supplemental awards and the progressive awards are displayed to the player via different gaming sequences.

In another embodiment, rather than selecting supplemental award bonus event threshold amounts, the central controller determines designated time periods to trigger bonus events by selecting from zero to a designated number of time periods (i.e. an amount of time which elapses from an initial point in time). For example, the central controller may select the time periods of one-hundred-twenty elapsed seconds and three-hundred elapsed seconds. In this embodiment, at each designated time period, a bonus event is triggered and the gaming system proceeds with providing supplemental awards and/or progressive awards as described below. In one embodiment, such a set time may be based on historic data. In another embodiment, supplemental award(s) and/or progressive award(s) are provided after a random amount of time.

In another embodiment, the central controller determines when to provide one or more bonus event awards based on a predefined variable reaching a defined parameter threshold. For example, the bonus award event is triggered when the $500{,}000^{th}$ player has played a gaming machine associated with one of the progressive awards (ascertained from a player tracking system). In different embodiments, the predefined parameter thresholds include a length of time, a length of time after a certain dollar amount is hit, a wager level threshold for a specific machine (which gaming device is the first to contribute $250,000), a number of gaming machines active, or any other parameter that would define a threshold for the progressive. In another embodiment, supplemental award(s) and/or progressive award(s) are provided after a random number of plays in which a progressive award is not provided to a player. In another embodiment, the central controller determines when to provide one or more bonus event awards based upon gaming system operator defined player eligibility parameters stored on a player tracking system (such as via a player tracking card or other suitable manner).

Another embodiment for determining when to provide one or more bonus event awards includes a system determination which is based on a random selection by the central controller. In this embodiment, the central controller tracks all active gaming machines and the wagers they placed (via an accumulated wager pool). When the accumulated wager pool at least exceeds a predefined threshold, the central controller randomly determines (at predetermined intervals) if a bonus event, such a progressive award bonus event, will occur. If the bonus event occurs, the central controller determines which of the players receive a bonus event award (i.e., which gaming devices, if any, receive supplemental bonus event awards and which gaming devices, if any, receive progressive bonus event awards). In this embodiment, such determinations are based, at least in part, on each gaming device's accumulated supplemental award pool. In one embodiment, the player who consistently places a higher wager is more likely to receive a bonus event award than a player who consistently places a minimum wager. In one embodiment, if the central controller randomly determines that a progressive award bonus event will not occur, the central controller randomly determines if a supplemental award bonus event will occur. If the supplemental award bonus event occurs, the central controller provides one or more supplemental awards to the player(s) at one or more gaming devices, wherein such supplemental awards are based on that gaming device's accumulated supplemental award pool and the associated range of supplemental award percentages.

In another embodiment, the central controller determines, in cooperation with the gaming device, when to provide one or more bonus event awards by utilizing one or more random number generators. In this embodiment, the central controller determines when to provide one or more bonus event awards by determining if any numbers allotted to a gaming device match a randomly selected number. In this embodiment, upon or prior to each play of each gaming machine, a random number is selected from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine is provided a supplemental bonus event award or progressive bonus event award.

It should be appreciated that while the gaming system described above utilizes tracked wagers in the gaming system to determine if a bonus event will occur, any suitable parameter which may be tracked may be implemented. For example, the wagers accumulated in one or more individual gaming devices in the gaming system may be tracked to determine if a bonus event will occur.

Information Provided to Player

As indicated above, the bonus event awards can be completely mystery bonus awards provided to the players of the gaming machines with or without explanation or information provided to the player, or alternatively can be displayed to the player. In one embodiment, suitable information about the bonus event awards can be provided to the players through one or more displays on the gaming machines or additional information displays positioned near the gaming machines, such as above a bank of system gaming machines.

This information can be used to entertain the player or inform the player that a bonus event has occurred or will occur. Examples of such information are:

(1) that a bonus event has occurred;

(2) that a bonus event will shortly occur (i.e., foreshadowing the bonus event);

(3) that one or more supplemental awards have been provided to one or more players of the system gaming machines;

(4) that one or more supplemental awards will be shortly provided to one or more players of the system gaming machines;

(5) which gaming machines have won the awards such as the progressive awards or supplemental awards;

(6) the amount of the supplemental awards won; and (7) the amount of the supplemental awards that can be won;

It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of gaming machines, each gaming machine including:

at least one input device;

at least one display device;

at least one processor; and at least one memory device which stores a plurality of instructions, which when executed by the at least one processor, cause the at least one processor to operate with the at least one display device and the at least one input device to enable a player to place at least one wager on at least one play of a primary game; and a controller configured to operate with the gaming machines to:

(a) for each of said plurality of gaming machines, maintain a separate accumulated supplemental award pool for said gaming machine, said maintained accumulated supplemental award pool for each gaming machine based, at least in part, on wagers placed at said gaming machine; and (b) upon an occurrence of a bonus event associated with an award and occurring in association with a first one of the gaming machines, for each of at least one of the other gaming machines:

(i) determine a supplemental award based on the accumulated supplemental award pool of said gaming machine and a selected supplemental award percentage, said selected supplemental award percentage being greater than zero, and (ii) cause said gaming machine to provide the determined supplemental award.

2. The gaming system of claim 1, wherein the supplemental award percentage is randomly selected.

3. The gaming system of claim 1, wherein the supplemental award percentage is selected from a plurality of supplemental award percentages, each of said supplemental award percentages associated with a probability of being selected.

4. The gaming system of claim 1, wherein at least one of the plurality of supplemental award percentages is greater than one-hundred percent.

5. The gaming system of claim 1, wherein for at least one of the other of the gaming machines, a value of the supplemental award provided by said gaming machine is different than a value of the accumulated supplemental award pool of said gaming machine.

6. The gaming system of claim 1, wherein for each of said gaming machines, when executed by the at least one processor of said gaming machine, the plurality of instructions cause the at least one processor to maintain the supplemental award pool for said gaming machine.

7. The gaming system of claim 1, wherein if a value of the accumulated supplemental award pool of a first of the other of the gaming machines is different than a value of the accumulated supplemental award pool of a second of the other of the gaming machines and the same supplemental award percentage is selected for the first and second of the other of the gaming machines, the controller is configured to cause a value of the provided supplemental award of said first of the other of the gaming machines to be different than a value of the provided supplemental award of said second of the other of the gaming machines.

8. The gaming system of claim 1, wherein the award associated with the triggered bonus event is a progressive award.

9. The gaming system of claim 1, wherein the controller is configured to cause the first one of the gaming machines to provide the award associated with the triggered bonus event.

10. The gaming system of claim 1, wherein the at least one processor of said first of the gaming machines causes the bonus event to occur.

11. A gaming system comprising:

a plurality of gaming machines, each gaming machine including:

at least one input device;

at least one display device;

at least one processor; and at least one memory device which stores a plurality of instructions, which when executed by the at least one processor, cause the at least one processor to operate with the at least one display device and the at least one input device; and a controller configured to operate with the gaming machines to:

(a) for each of a plurality of players, maintain a separate accumulated supplemental award pool for said player, said accumulated supplemental award pool maintained for each player based, at least in part, on wagers placed by said player at said plurality of gaming machines; and (b) upon an occurrence of a bonus event associated with an award and occurring in association with a first one of the gaming machines, for each of at least one of the other gaming machines:

(i) determine a supplemental award based on the accumulated supplemental award pool maintained for said player at said gaming machine and a selected supplemental award percentage, said selected supplemental award percentage being greater than zero, and (ii) cause said gaming machine to provide the determined supplemental award to said player at said gaming machine.

12. The gaming system of claim 11, wherein the supplemental award percentage is randomly selected.

13. The gaming system of claim 11, wherein the supplemental award percentage is selected from a plurality of supplemental award percentages, each of said supplemental award percentages associated with a probability of being selected.

14. The gaming system of claim 11, wherein at least one of the plurality of supplemental award percentages is greater than one-hundred percent.

15. The gaming system of claim 11, wherein for at least one of the other of the gaming machines, a value of the supplemental award provided by said gaming machine is different than a value of the accumulated supplemental award pool maintained for said player at said gaming machine.

16. The gaming system of claim 11, wherein if a value of the accumulated supplemental award pool maintained for a first of the players is different than a value of the accumulated supplemental award pool maintained for a second of the players and the same supplemental award percentage is selected for the first and second of the players, the controller is configured to cause a value of the supplemental award provided to the first of the players to be different than a value of the supplemental award provided to the second of the players.

17. The gaming system of claim 11, wherein the award associated with the triggered bonus event is a progressive award.

18. The gaming system of claim 11, wherein the controller is configured to cause the first one of the gaming machines to provide the award associated with the triggered bonus event.

19. The gaming system of claim 11, wherein the at least one processor of said first of the gaming machines causes the bonus event to occur.

20. A gaming system comprising:

a plurality of gaming machines, each gaming machine including:

at least one input device;

at least one display device;

at least one processor; and at least one memory device which stores a plurality of instructions, which when executed by the at least one processor, cause the at least one processor to operate with the at least one display device and the at least one input device; and a controller configured to operate with the gaming machines to:

(a) for each of a plurality of players, maintain a separate accumulated supplemental award pool for said player, wherein said accumulated supplemental award pool maintained for each player is based, at least in part, on wagers placed by said player at said gaming machines;

(b) additionally maintain at least one progressive award, wherein said at least one progressive award is separate from the plurality of accumulated supplemental award pools, and said at least one progressive award is funded, at least in part, based on wagers placed on any primary games of the gaming machines; and (c) upon a triggering of a bonus event associated with each progressive award:

(i) select one of the gaming machines, (ii) cause the selected gaming machine to provide the progressive award associated with the triggered bonus event, (iii) cause at least one of the other gaming machines to provide a supplemental award, wherein for each of said at least one of the other gaming machines, the supplemental award provided by said gaming machine is based, at least in part, on the accumulated supplemental award pool maintained for said player at said gaming machine, and (iv) if a value of the accumulated supplemental award pool maintained for a first of said players is different than a value of the accumulated supplemental award pool maintained for a second of said players, a value of the supplemental award provided to the first of said players is different than a value of the supplemental award provided to the second of said players.

21. The gaming system of claim 20, wherein for at least one of said gaming machines, a value of the supplemental award provided by said gaming machine is different than a value of the accumulated supplemental award pool maintained for said player at said gaming machine.

22. The gaming system of claim 20, wherein the controller is programmed to determine if a supplemental award event occurs, wherein the supplemental award event occurs based, at least in part, on said at least one progressive award.

23. The gaming system of claim 22, wherein upon the occurrence of the supplemental award event, without causing any of said gaming machines to provide any progressive awards, for each of at least one of said plurality of gaming machines, the controller is programmed to:

(i) determine a supplemental award, wherein the determined supplemental award is based, at least in part, on the supplemental award pool maintained for said player at said gaming machine, (ii) cause said gaming machine to provide said determined supplemental award, and (iii) reset the supplemental award pool maintained for said player at said gaming machine.

24. A method of operating a gaming system including a plurality of gaming machines and a controller, said method comprising:

(a) for each of the plurality of gaming machines:

(i) enabling a player to place at least one wager on at least one play of a primary game, and (ii) maintaining a separate accumulated supplemental award pool for said gaming machine, said maintained accumulated supplemental award pool for each gaming machine based, at least in part, on wagers placed at said gaming machine; and (b) upon an occurrence of a bonus event associated with an award and occurring in association with a first one of the gaming machines, for each of at least one of the other gaming machines:

(i) determining a supplemental award based on the accumulated supplemental award pool of said gaming machine and a selected supplemental award percentage, said selected supplemental award percentage being greater than zero, and (ii) causing said gaming machine to provide the determined supplemental award.

25. The method of claim 24, which includes randomly selecting the supplemental award percentage.

26. The method of claim 24, which includes selecting the supplemental award percentage from a plurality of supplemental award percentages, each of said supplemental award percentages associated with a probability of being selected.

27. The method of claim 24, wherein at least one of the plurality of supplemental award percentages is greater than one-hundred percent.

28. The method of claim 24, wherein for at least one of the other of the gaming machines, a value of the supplemental award provided by said gaming machine is different than a value of the accumulated supplemental award pool of said gaming machine.

29. The method of claim 24, which includes, for each of said gaming machines, maintaining the supplemental award pool for said gaming machine.

30. The method of claim 24, which includes causing a value of the provided supplemental award of a first of the other of the gaming machines to be different than a value of the provided supplemental award of a second of the other of the gaming machines if a value of the accumulated supplemental award pool of the first of the other of the gaming machines is different than a value of the accumulated supplemental award pool of the second of the other of the gaming machines and the same supplemental award percentage is selected for the first and second of the other of the gaming machines.

31. The method of claim 24, wherein the award associated with the triggered bonus event is a progressive award.

32. The method of claim 24, which includes causing the first one of the gaming machines to provide the award associated with the triggered bonus event.

33. The method of claim 24, which includes causing at least one processor of said first of the gaming machines to execute a plurality of instructions to cause the bonus event to occur.

34. The method of claim 24, which is operated through a data network.

35. The method of claim 34, wherein the data network is an internet.

36. A method of operating a gaming system including a plurality of gaming machines and a controller, said method comprising:

(a) for each of a plurality of players, maintaining a separate accumulated supplemental award pool for said player, said accumulated supplemental award pool maintained for each player based, at least in part, on wagers placed by said player at said plurality of gaming machines; and (b) upon an occurrence of a bonus event associated with an award and occurring in association with a first one of the gaming machines, for each of at least one of the other gaming machines:

(i) determining a supplemental award based on the accumulated supplemental award pool maintained for said player at said gaming machine and a selected supplemental award percentage, said selected supplemental award percentage being greater than zero, and (ii) causing said gaming machine to provide the determined supplemental award to said player at said gaming machine.

37. The method of claim 36, which includes randomly selecting the supplemental award percentage.

38. The method of claim 36, which includes selecting the supplemental award percentage from a plurality of supplemental award percentages, each of said supplemental award percentages associated with a probability of being selected.

39. The method of claim 36, wherein at least one of the plurality of supplemental award percentages is greater than one-hundred percent.

40. The method of claim 36, wherein for at least one of the other of the gaming machines, a value of the supplemental award provided by said gaming machine is different than a value of the accumulated supplemental award pool maintained for said player at said gaming machine.

41. The method of claim 36, which includes causing a value of the supplemental award provided to a first of the players to be different than a value of the supplemental award provided to a second of the players if a value of the accumulated supplemental award pool maintained for the first of the players is different than a value of the accumulated supplemental award pool maintained for the second of the players and the same supplemental award percentage is selected for the first and second of the players.

42. The method of claim 36, wherein the award associated with the triggered bonus event is a progressive award.

43. The method of claim 36, which includes causing the first one of the gaming machines to provide the award associated with the triggered bonus event.

44. The method of claim 36, which includes causing at least one processor of said first of the gaming machines to execute a plurality of instructions to cause the bonus event to occur.

45. The method of claim 36, which is operated through a data network.

46. The method of claim 45, wherein the data network is an internet.

47. A method of operating a gaming system including a plurality of gaming machines and a controller, said method comprising:

(a) for each of a plurality of players, maintaining a separate accumulated supplemental award pool for said player, wherein said accumulated supplemental award pool maintained for each player is based, at least in part, on wagers placed by said player at said gaming machines;

(b) additionally maintaining at least one progressive award, wherein said at least one progressive award is separate from the plurality of accumulated supplemental award pools, and said at least one progressive award is funded, at least in part, based on wagers placed on any primary games of the gaming machines; and (c) upon a triggering of a bonus event associated with each progressive award:

(i) selecting one of the gaming machines, (ii) causing the selected gaming machine to provide the progressive award associated with the triggered bonus event, (iii) causing at least one of the other gaming machines to provide a supplemental award, wherein for each of said at least one of the other gaming machines, the supplemental award provided by said gaming machine is based, at least in part, on the accumulated supplemental award pool maintained for said player at said gaming machine, and (iv) if a value of the accumulated supplemental award pool maintained for a first of said players is different than a value of the accumulated supplemental award pool maintained for a second of said players, a value of the supplemental award provided to the first of said players is different than a value of the supplemental award provided to the second of said players.

48. The method of claim 47, wherein for at least one of said gaming machines, a value of the supplemental award provided by said gaming machine is different than a value of the accumulated supplemental award pool maintained for said player at said gaming machine.

49. The method of claim 47, which includes determining if a supplemental award event occurs, wherein the supplemental award event occurs based, at least in part, on said at least one progressive award.

50. The method of claim 49, wherein upon the occurrence of the supplemental award event, without causing any of said gaming machines to provide any progressive awards, for each of at least one of said plurality of gaming machines:

(i) determining a supplemental award, wherein the determined supplemental award is based, at least in part, on the supplemental award pool maintained for said player at said gaming machine, (ii) causing said gaming machine to provide said determined supplemental award, and (iii) resetting the supplemental award pool maintained for said player at said gaming machine.

51. The method of claim 47, which is operated through a data network.

52. The method of claim 51, wherein the data network is an internet.

* * * * *